United States Patent
Inomata et al.

(10) Patent No.: US 7,224,820 B2
(45) Date of Patent: May 29, 2007

(54) ELECTRONIC DOCUMENT, GENUINENESS MANAGEMENT METHOD FOR PRINT MEDIUM THEREOF, GENUINENESS MANAGEMENT SYSTEM, PROGRAM, AND PROGRAM RECORDING MEDIUM

(75) Inventors: Hirofumi Inomata, Tokyo (JP); Takeshi Matsuki, Musashino (JP); Hiroshi Yoshiura, Tokyo (JP); Hideo Noyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 854 days.

(21) Appl. No.: 10/378,113

(22) Filed: Feb. 28, 2003

(65) Prior Publication Data
US 2004/0052400 A1 Mar. 18, 2004

(30) Foreign Application Priority Data
Sep. 13, 2002 (JP) .............................. 2002-268080

(51) Int. Cl.
*G06K 9/00* (2006.01)
(52) U.S. Cl. ..................................... 382/100
(58) Field of Classification Search ................ 382/100; 358/3.28
See application file for complete search history.

(56) References Cited

U.S. PATENT DOCUMENTS 5,754,659 A * 5/1998 Sprunk et al. ................. 380/30
7,093,130 B1 * 8/2006 Kobayashi et al. .......... 713/176
2002/0007403 A1 1/2002 Echizen et al.
2002/0009208 A1 * 1/2002 Alattar et al. ............... 382/100
2003/0149879 A1 * 8/2003 Tian et al. ................... 713/176
2003/0223584 A1 * 12/2003 Bradley et al. ............. 380/229
2005/0135656 A1 * 6/2005 Alattar et al. ............... 382/100

* cited by examiner

Primary Examiner—Bhavesh M Mehta
Assistant Examiner—Jordan Kuhn
(74) Attorney, Agent, or Firm—Townsend and Townsend and Crew LLP

(57) ABSTRACT

A method for managing genuine characteristics of both an electronic document and a print medium comprising: a step for recognizing image data contained in the electronic document; a step for applying an extraction condition of an image feature previously determined and must be considered to the recognized image data to calculate a coordinate set corresponding to a pixel or a set of pixels, constituting the image feature; a step for recognizing at least a coordinate value among coordinate values and pixel color values, corresponding to each of coordinates constituting the coordinate set, and for embedding the recognized coordinate value as a code of a digital watermark into the pixel or the pixel set, constituting the image feature, or into an area in the vicinity; and a step for outputting the electronic document where the digital watermark embedding process operation has been carried out to the print medium.

8 Claims, 16 Drawing Sheets

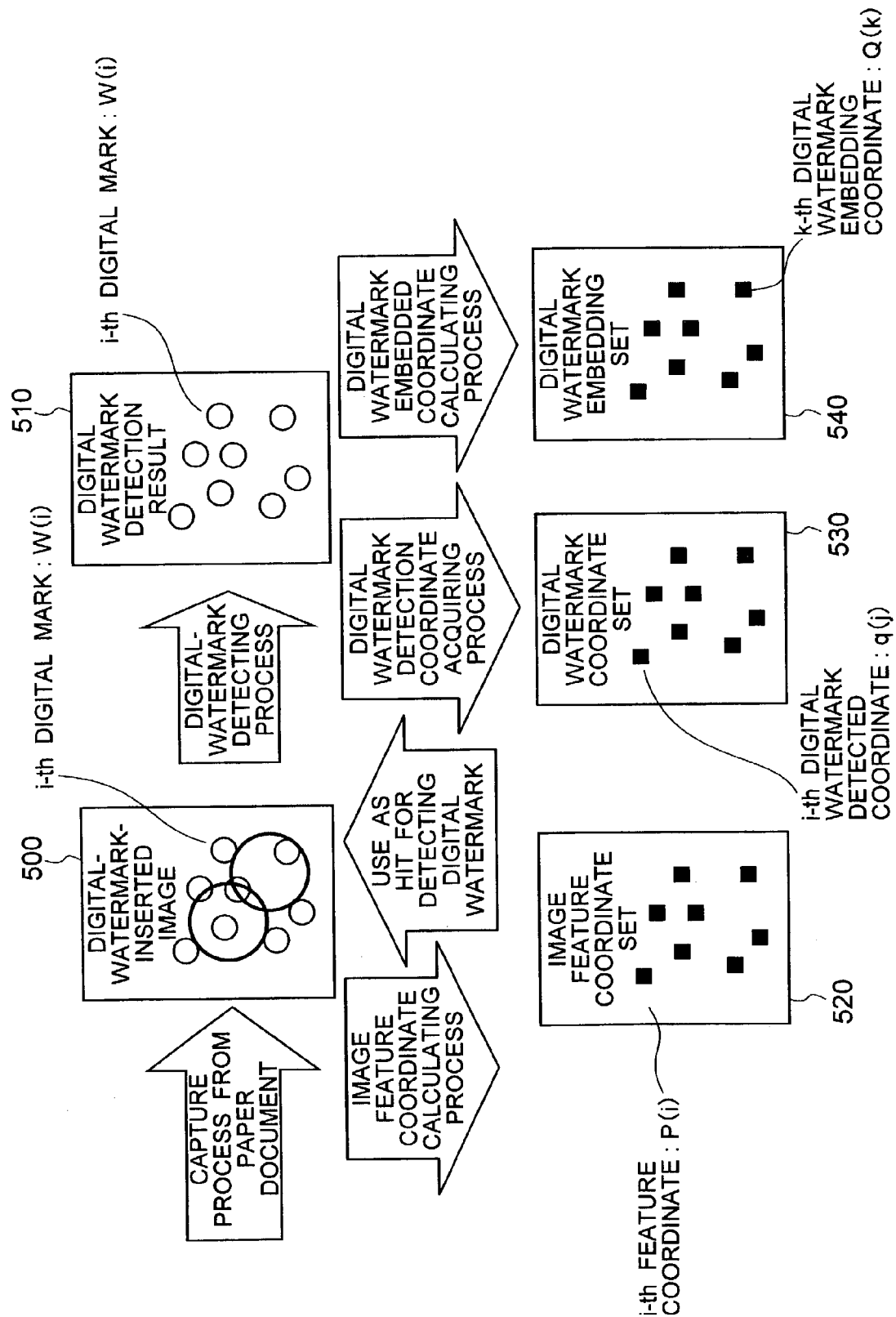

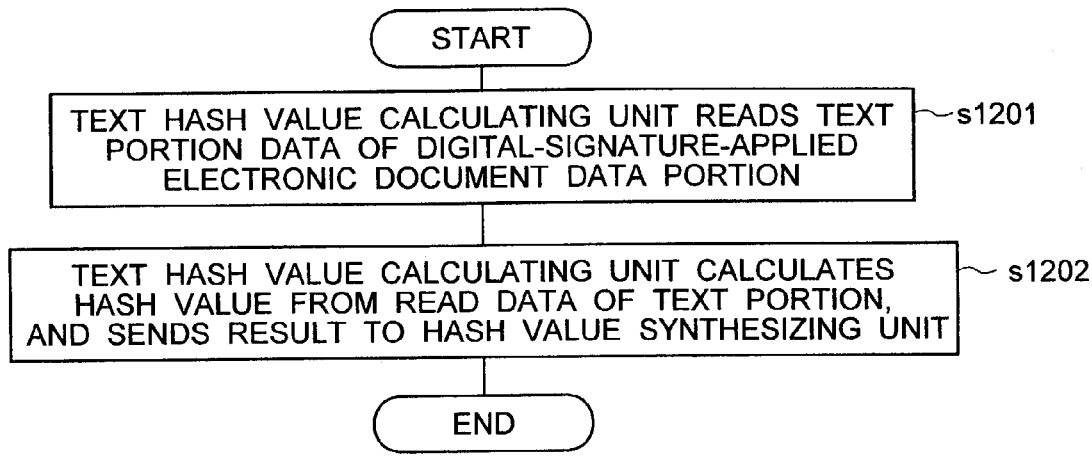
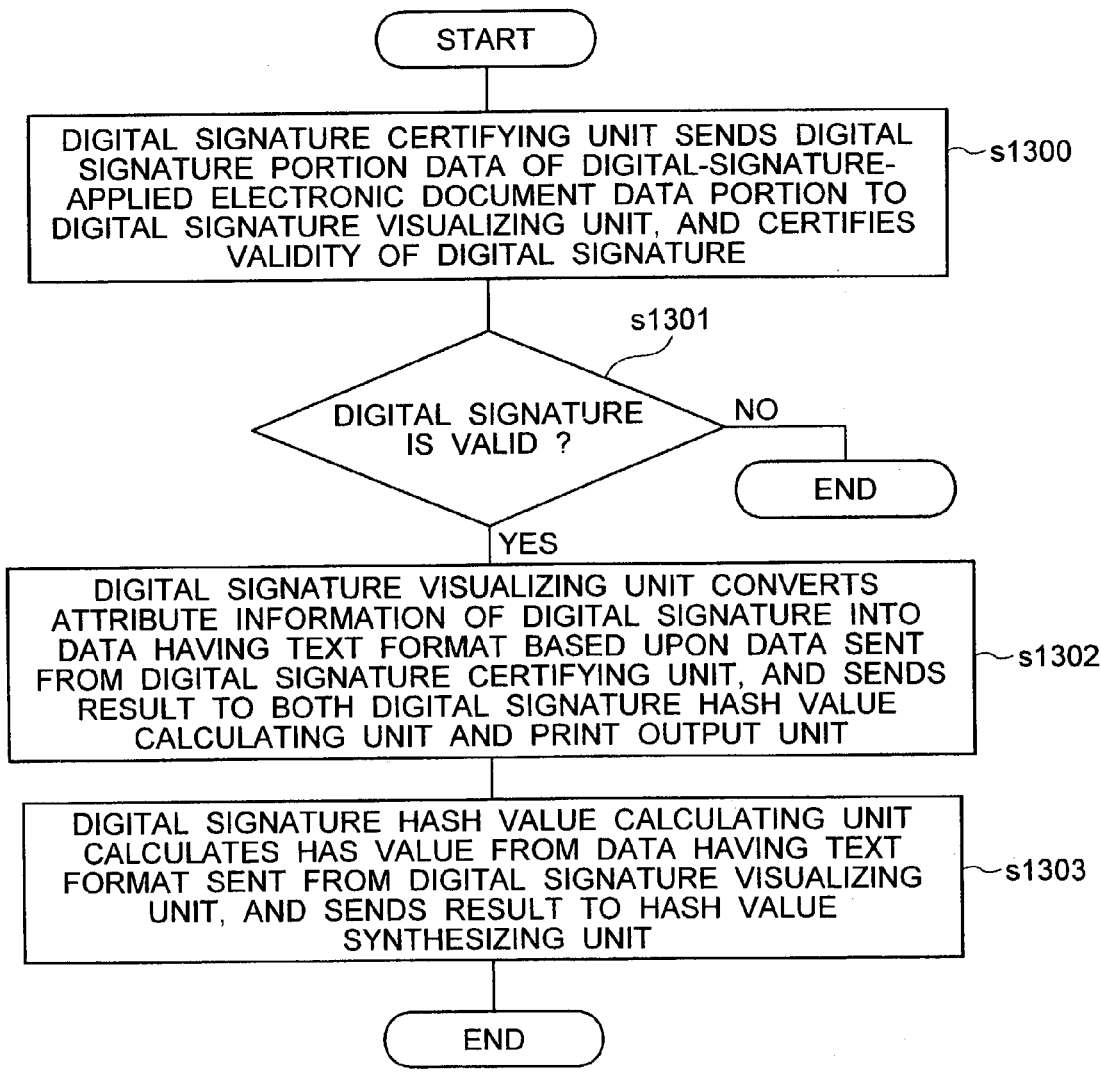

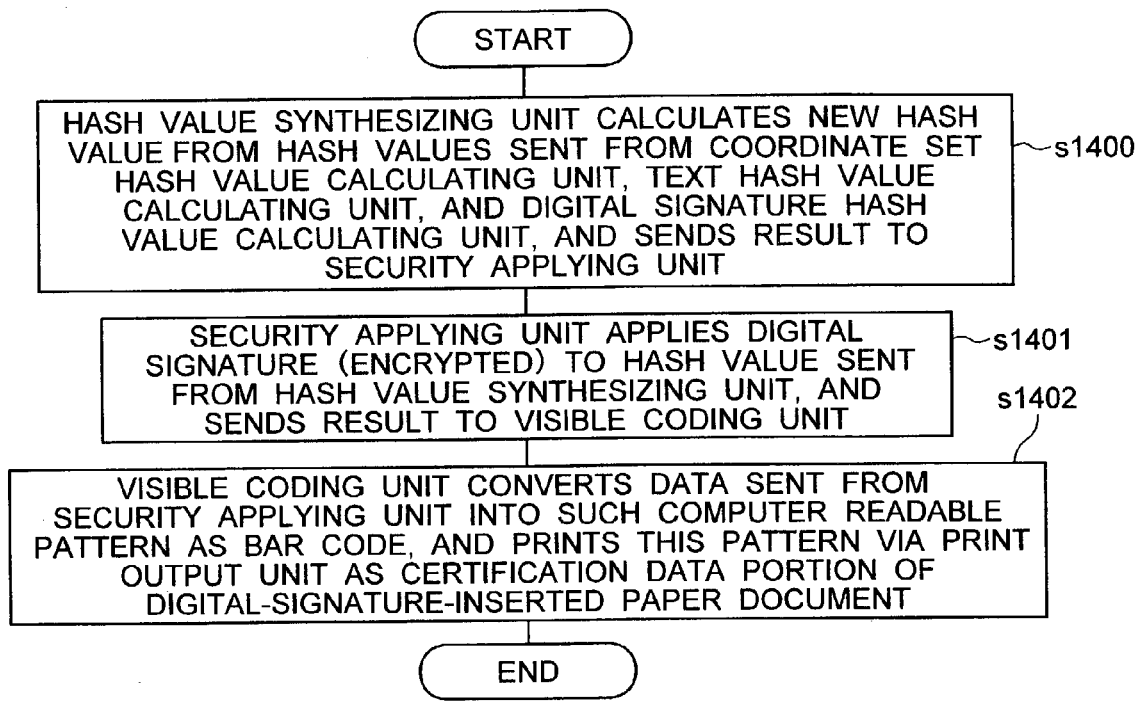
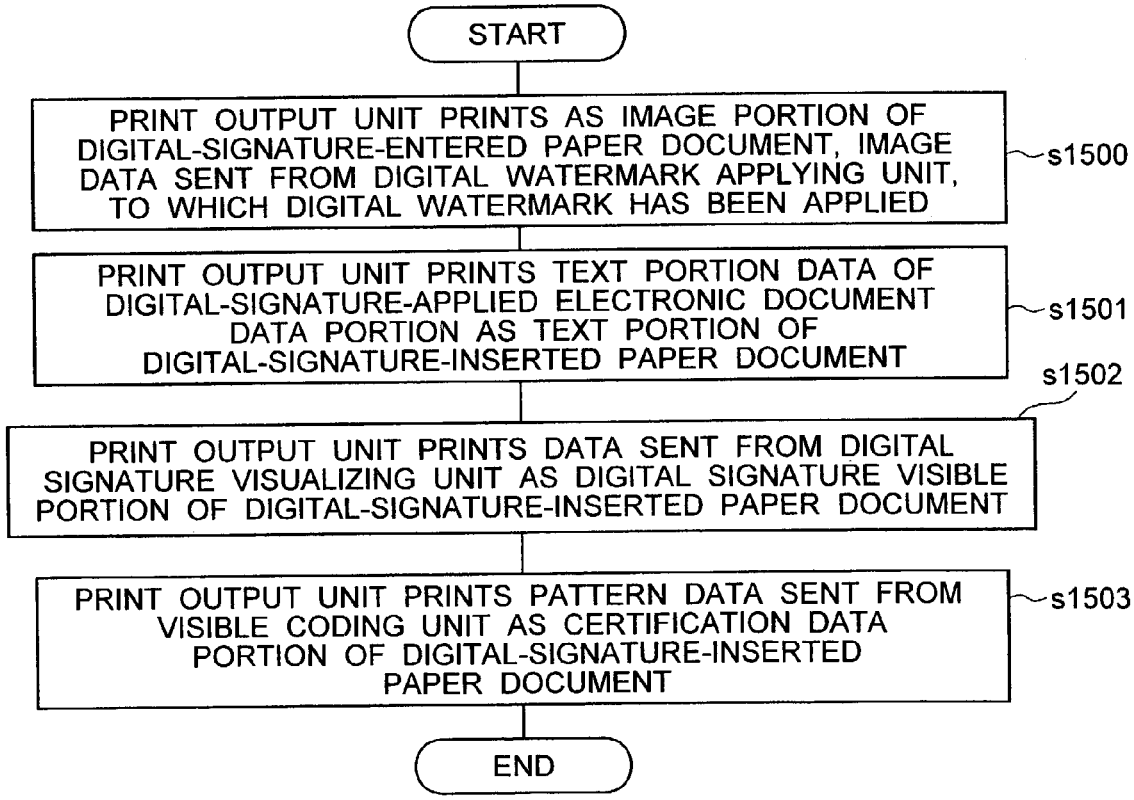

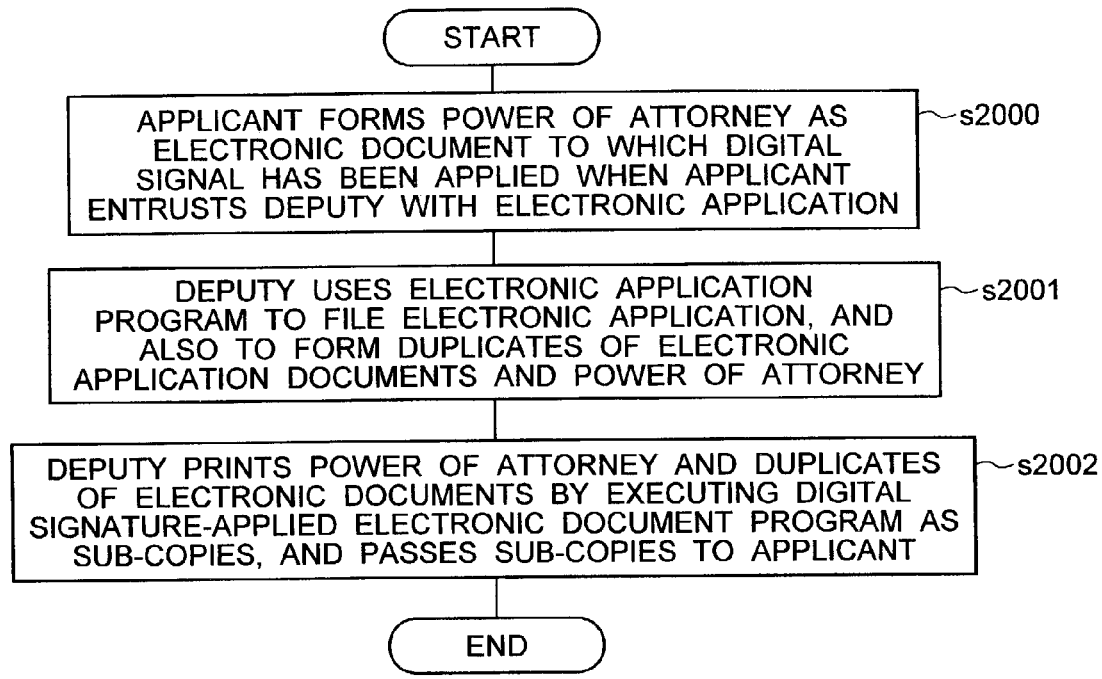
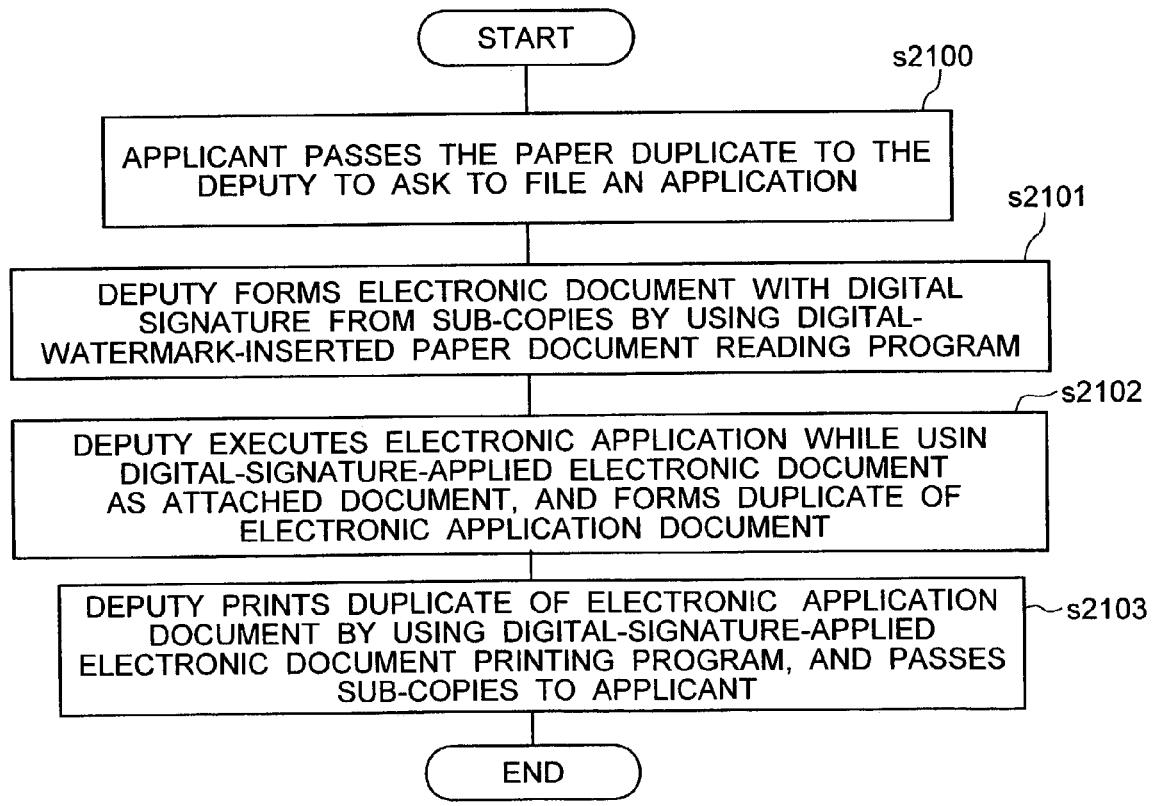

ELECTRONIC DOCUMENT, GENUINENESS MANAGEMENT METHOD FOR PRINT MEDIUM THEREOF, GENUINENESS MANAGEMENT SYSTEM, PROGRAM, AND PROGRAM RECORDING MEDIUM

BACKGROUND OF THE INVENTION

The present invention is related to a genuineness management method for managing genuine characteristics of an electronic document and a print medium thereof, a genuineness management system, a program, and also a program recording medium.

As methods for correctly managing sources of electronic documents and print media thereof, management methods using digital watermarks have been proposed. Digital watermarking implies such techniques capable of embedding (inserting) specific information into electronic data, e.g., image data and voice data in such a way that this specific information gives no adverse influence to qualities of these electronic data. For instance, names, digital signatures, and the like as to producers and marketing staffs of electronic data are embedded, so that sources of producers and marketing sources can be specified. For example, in the case that image data are employed, there are many possibilities that different information from these image data is embedded by arranging bit streams indicative of luminance of pixels. As an example of digital watermark inserting method, digital watermarks are inserted into featured portions of images. As one of this digital watermarking method, Patent Publication 1 (namely, US2002/0007403 A1) has been proposed.

SUMMARY OF THE INVENTION

However, Inventors of the present invention could reveal certain problems in the conventional digital watermarking technique of Patent publication 1, while methods of managing genuine characteristics of documents in electronic application services (electronic filing services) are investigated. That is, in this digital watermarking technique, although such an information capable of specifying a producing source of image data and a marketing source thereof can be embedded into this image data, this digital watermarking technique cannot be properly applied to such techniques capable of identifying as to whether or not the image data itself has been altered. This electronic application service corresponds to one of governmental services in which electronic documents having digital signatures are transmitted/received between terminals of users and servers owned by governmental offices.

While the electronic documents with the digital signatures are transmitted/received in such a manner, the techniques capable of recovering original security could not be established with respect to, in particular, image data, although such a transition is made that electronic documents are changed into paper documents, and also these paper documents are also recovered into electronic documents. For instance, as to an image which is handled as analog information on a print medium, even when this image is directly captured by using an image scanner, or the like, electronic data of this analog information cannot be acquired. In other words, once such an image has been printed on the print medium, and then significance of a digital signature which constitutes a key of genuineness guarantees cannot be obtained. As a consequence, it is practically difficult to guarantee genuine characteristics as to electronic documents (containing images) printed on print media such as paper.

The present invention has been made to solve such a problem, and therefore, has an object to provide a method for managing genuine characteristics of both an electronic document and a print medium thereof.

To achieve the above-described object, a genuineness management method for an electronic document and a print medium thereof, according to the present invention, is featured by such a genuineness management method for managing genuine characteristics of both an electronic document and a print medium thereof by using a computer, wherein: the computer executes: a step for recognizing image data contained in the electronic document; a step for applying an extraction condition of an image feature which has been previously determined and must be considered to the recognized image data so as to calculate a coordinate set corresponding to either a pixel or a set of pixels, which constitute the image feature; a step for recognizing at least a coordinate value among coordinate values and pixel color values, which correspond to each of coordinates constituting the coordinate set, and for embedding the recognized coordinate value as a code of a digital watermark into either the pixel or the pixel set, which constitute the image feature, or into an area in the vicinity thereof; and a step for outputting the electronic document to which the digital watermark embedding process operation has been carried out to the print medium.

Other problems and solving methods thereof disclosed by the present invention may become more apparent from various embodiments and drawings of the present invention.

BRIEF DESCRIPTION OF THE DRAWINGS

FIG. 5 is a diagram for showing a conceptional idea of a digital watermark detecting/certifying method according to an embodiment of the present invention.

FIG. 11 is a diagram for indicating an example of a text processing sequential operation by the print tool in the genuineness management method of this embodiment.

FIG. 12 is a diagram for indicating an example of an electronic signature processing sequential operation by the print tool in the genuineness management method of this embodiment.

FIG. 13 is a diagram for indicating an example of a certification data processing sequential operation by the print tool in the genuineness management method of this embodiment.

FIG. 14 is a diagram for indicating an example of a print processing sequential operation by the print tool in the genuineness management method of this embodiment.

FIG. 19 is a diagram for representing a sequential operation example (first time) of the electronic application procedure according to this embodiment.

FIG. 20 is a diagram for indicating a sequential operation example (next time and succeeding times) of the electronic application procedure according to this embodiment.

DESCRIPTION OF THE EMBODIMENTS

Figure 1:
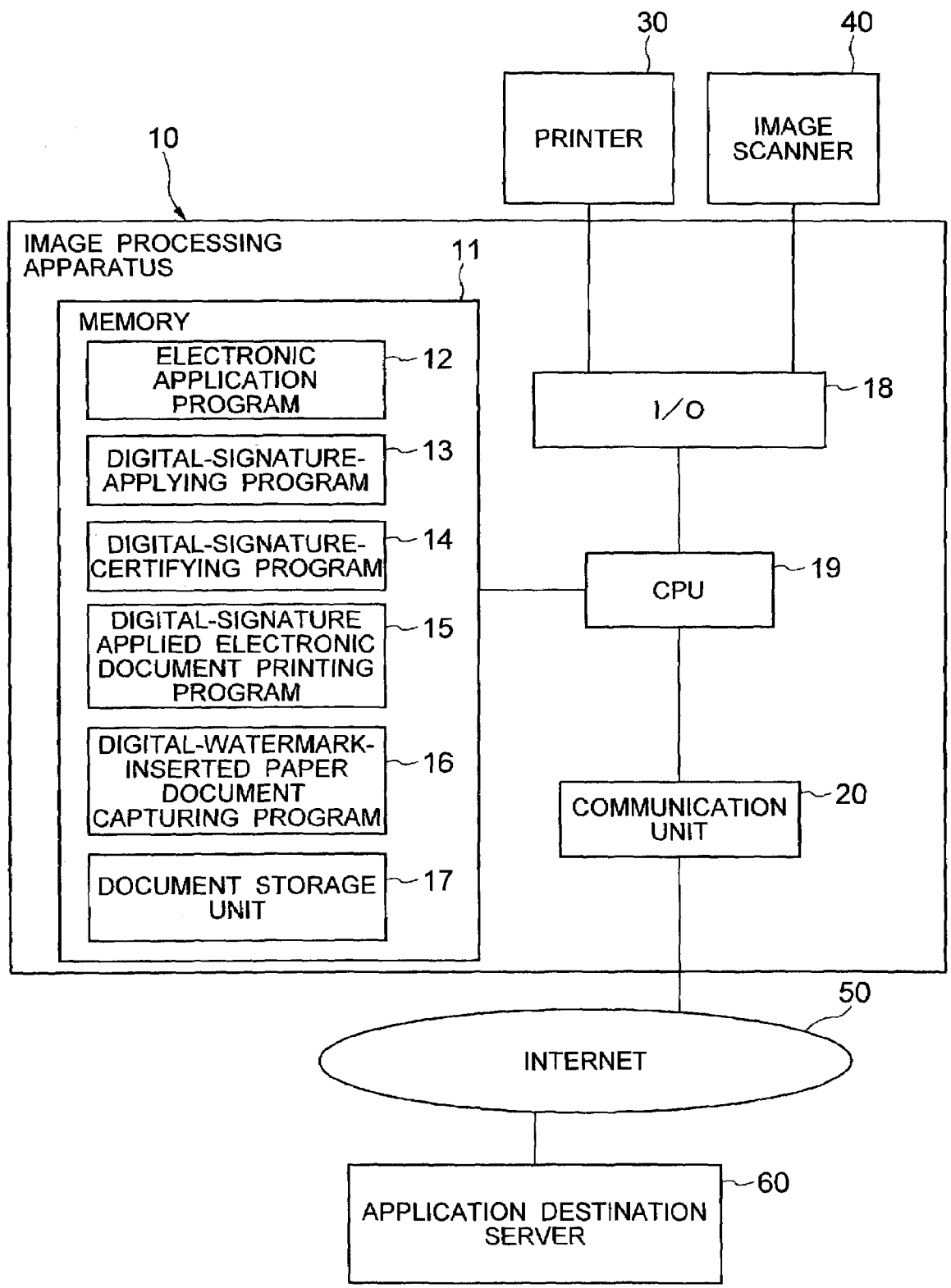
FIG. 1 is a network structural diagram contains a genuineness management system according to an embodiment of the present invention.

Based upon descriptions of this patent specification, at least the below-mentioned facts may be revealed.

The above-described genuineness management method may be comprised of: a step for recognizing text data contained in the electronic document; a step for applying a hash function to the recognized text data so as to produce a hash value originated from the text data; a step for applying a hash function to at least the coordinate value among the coordinate values and the pixel color values, which correspond to each of the coordinates constituting the coordinate set so as to produce a hash value originated from the image data; a step for producing a synthesized hash value by synthesizing the hash value originated from the text data with the hash value originated from the image data; a step for giving a digital signature to the synthesized hash value; a step for converting the synthesized hash value to which the digital signature has been given into a computer readable visible pattern so as to produce visible certification data; and a step for applying the visible certification data to the electronic document to which the digital watermark embedding process operation has been executed, and for outputting the resulting electronic document to the print medium. As a result, as to the electronic document containing both the text data and the image data, the process operation capable of guaranteeing genuine characteristics thereof can be carried out.

Also, the above-described genuineness management method may be comprised of: a step for recognizing a digital signature contained in the electronic document; a step for certifying validity of the recognized digital signature; a step for applying a hash function to attribute information of the digital signature whose validity has been certified so as to produce a hash value originated from the digital signature; and a step for synthesizing the hash value originated from the digital signature with both the hash value originated from the text data and the hash value originated from the image data so as to produce the synthesized hash value. As a result, as to the electronic document containing the text data, the image data, and the digital signature, the process operation capable of guaranteeing genuine characteristics thereof can be carried out.

Furthermore, the above-explained genuineness management method may be comprised of: a step for converting attribute information of a digital signature contained in the digital document into digital-signature-visible data; and a step for applying the digital-signature-visible data to the electronic document to which the digital watermark embedding process operation has been executed, and for outputting the resulting electronic document to the print medium. As a consequence, the digital signature can be visibly outputted on the print medium.

Also, the above-described genuineness management method may be comprised of: a step for applying a hash function to at least the coordinate value among the coordinate values and the pixel color values so as to produce a hash value originated from the image data; and a step for containing the produced hash value in the digital watermark code. As a result, the security aspect of the digital watermark can be improved.

Moreover, the above-described genuineness management method may be comprised of: a step in which the computer owns a storage unit, and executes an image capturing process operation with respect to the print medium to which the electronic document has been outputted; a step for applying the extraction condition of the image feature which has been previously determined and must be considered to the image data captured by the image capturing process operation so as to calculate a reference coordinate set corresponding to either the pixel or the pixel set, which constitute the image feature; a step for detecting a digital watermark contained in the image data based upon the respective coordinates which constitute the reference coordinate set so as to recognize the digital watermark coordinate set; a step for recognizing at least an embedded coordinate value among the embedded coordinate values of the detected digital watermark and pixel color values thereof; a step for extracting both a reference coordinate and an embedded coordinate value of a digital watermark coordinate in which a coordinate value is located within a predetermined error range so as to produce an embedded coordinate set; a step for applying a hash function to at least a coordinate value among the coordinate values and the pixel color values, which constitute the embedded coordinate set, so as to produce a hash value originated from the embedded coordinate; a step for identifying the hash value which is recognized based upon the visible certification data by the capturing process operation with the hash value of the embedded coordinate in order to judge as to whether or not the recognized hash value is made coincident with the hash value originated from the embedding coordinate; and a step in which if the recognized hash value is made coincident with the hash value as a result of the judgement, then an electronic document containing at least the image data is stored into the storage unit. As a consequence, with respect to the print medium on which the electronic document has been outputted, the genuine characteristic of the image data contained in this print medium can be guaranteed.

Also, the above-described genuineness management method may be comprised of: a step for applying hash functions to both text data and a digital signature, respectively, which are captured by the image capturing process operation, so as to produce hash values; and a step for synthesizing both the produced hash value originated from the text data and the produced hash value originated from the digital signature with the hash value originated from the embedded coordinate in order to produce a synthesized hash value originated from the captured data; and a step for identifying the synthesized hash value originated from the captured data with the hash value recognized by the visible certification data in order to judge as to whether or not the synthesized hash value is made coincident with the recognized hash value. As a result, with respect to the print medium of the electronic document, the genuine characteristics as to both the text data and the digital signature in addition to the image data can be guaranteed.

Further, the above-described genuineness management method may be comprised of: a step in which when the image capturing process operation is executed, formats of the respective data contained in the print medium to be captured are recognized; a step for identifying the recognized format with a table which determines formats to be captured as image data; a step for recognizing the image data to be captured by the image capturing process operation as a result of the identification; and a step for capturing an image with respect to the recognized image data. As a consequence, when the capturing process operation for the print medium is carried out, the image data can be effectively selected.

Also, a genuineness management system, according to another aspect of the present invention, is featured by such a genuineness management system for managing genuine characteristics of both an electronic document and a print medium, comprising: means for recognizing image data contained in the electronic document; means for applying an extraction condition of an image feature which has been previously determined and must be considered to the recognized image data so as to calculate a coordinate set corresponding to either a pixel or a set of pixels, which constitute the image feature; means for recognizing at least a coordinate value among coordinate values and pixel color values, which correspond to each of coordinates constituting the coordinate set, and for embedding the recognized coordinate value as a code of a digital watermark into either the pixel or the pixel set, which constitute the image feature, or into an area in the vicinity thereof; and means for outputting the electronic document to which the digital watermark embedding process operation has been carried out to the print medium. As a consequence, the system capable of realizing the genuineness management method of the present invention can be accomplished.

Furthermore, a computer program capable of executing the genuineness management method, according to another aspect of the present invention, is featured by such a program which causes a computer to execute a method of managing genuine characteristics of both an electronic document and a print medium thereof, wherein: the program causes the computer to execute: a step for recognizing image data contained in the electronic document; a step for applying an extraction condition of an image feature which has been previously determined and must be considered to the recognized image data so as to calculate a coordinate set corresponding to either a pixel or a set of pixels, which constitute the image feature; a step for recognizing at least a coordinate value among coordinate values and pixel color values, which correspond to each of coordinates constituting the coordinate set, and for embedding the recognized coordinate value as a code of a digital watermark into either the pixel or the pixel set, which constitute the image feature, or into an area in the vicinity thereof; and a step for outputting the electronic document to which the digital watermark embedding process operation has been carried out to the print medium. Accordingly, the genuineness management method of the present invention can be executed on the computer.

Also, a computer-readable recording medium may be obtained which records thereon the above-described genuineness management program. As a consequence, the above-explained genuineness management program can be provided with the computer.

Figure 2:
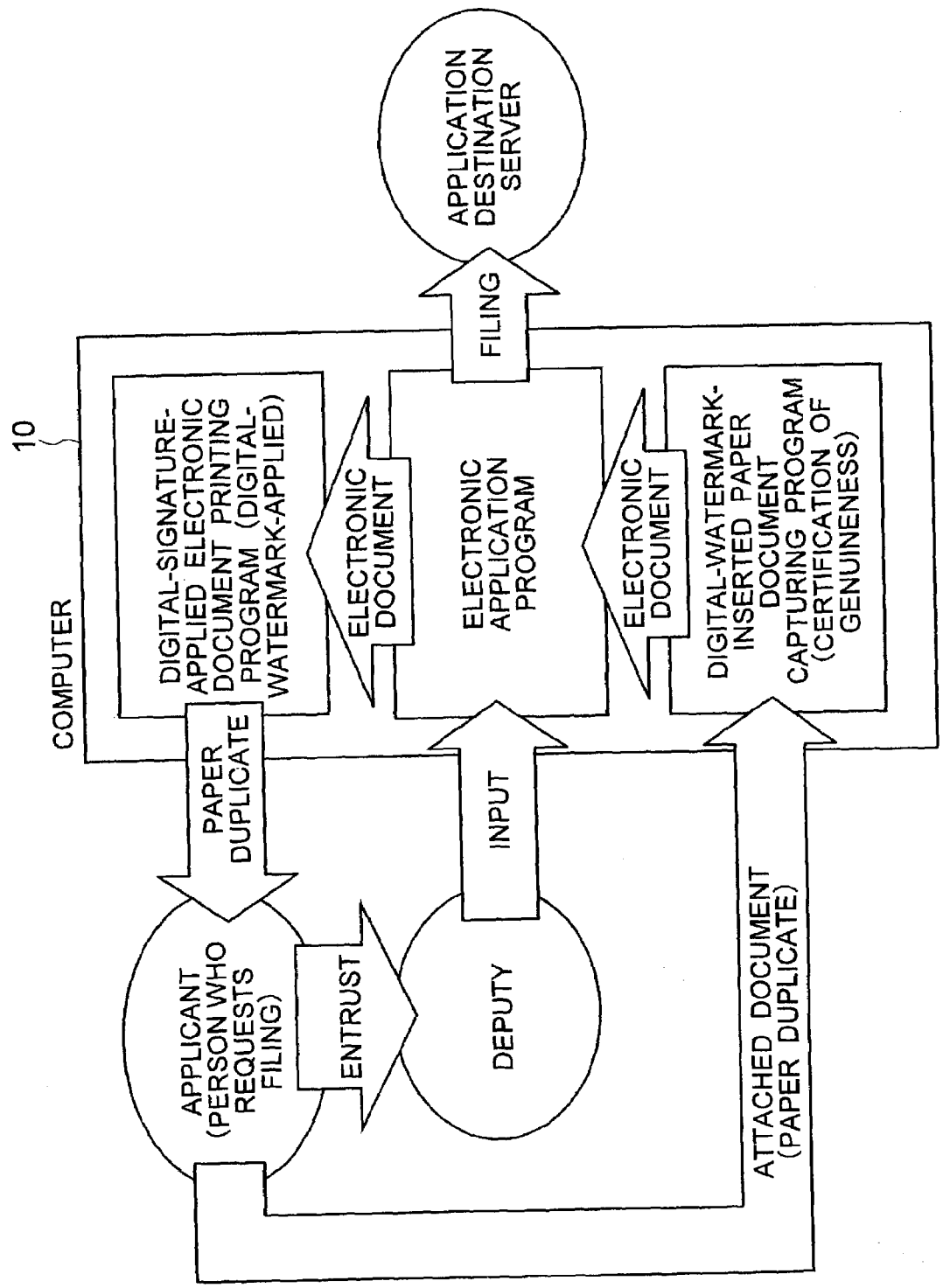
FIG. 2 is a diagram for indicating one conceptional sequential operation example of an electronic application procedure according to this embodiment.
Figure 3:
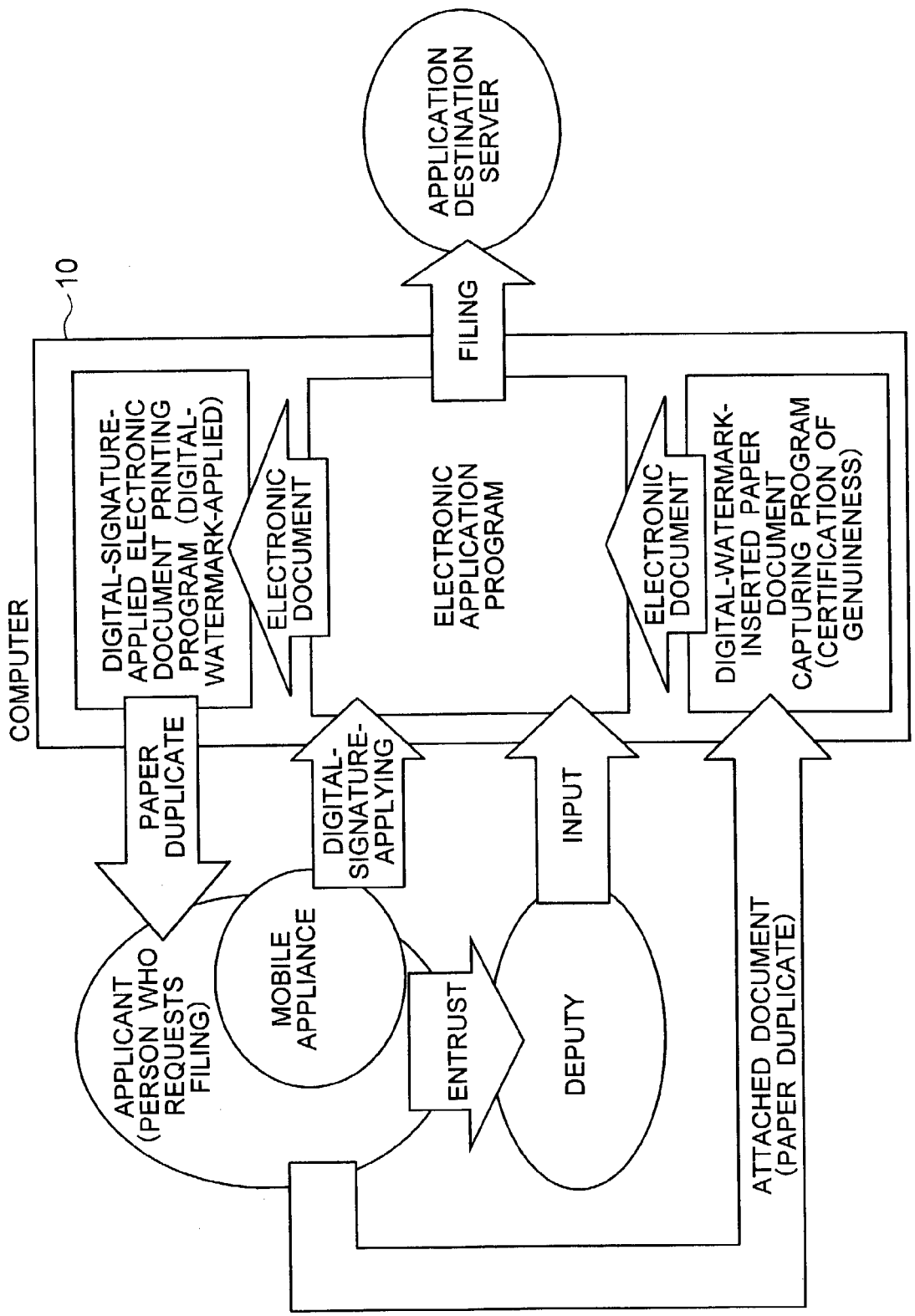
FIG. 3 is a diagram for showing another conceptional sequential operation example of the electronic application procedure shown in FIG. 2.

Referring now to drawings, various embodiments of the present invention will be described in detail. FIG. 1 is a network structural diagram contains a genuineness management system according to an embodiment of the present invention. FIG. 2 is a diagram for indicating one conceptional sequential operation example of an electronic application procedure according to this embodiment. FIG. 3 is a diagram for showing another conceptional sequential operation example of the electronic application procedure indicated in FIG. 2. A computer for executing a major information processing operation as a system capable of realizing a genuineness management method according to this embodiment corresponds to an information processing apparatus 10 (will be referred to as a computer hereinafter). This computer 10 is constituted by a memory 11, an I/O apparatus 18, a CPU 19, and a communication unit 20. The memory 11 functions as a storage apparatus for storing a program and various sorts of data, while this program causes the computer 10 to execute the genuineness management method. The I/O apparatus 18 functions as an interface for interfacing between this computer 10 and an connected appliance. The CPU 19 corresponds to a central processing unit. The communication unit 20 is capable of executing a data communication by connecting the computer 10 with a network such as the Internet 50.

Also, this computer 10 corresponds to such a computer which is provided by a deputy (representative) who files, for example, various sorts of applications and various proposals with respect to governmental offices and the like on behalf of applicants theirselves. To this end, this computer 10 is connected to an application destination server 60 which actually accepts electronic applications and processes these accepted electronic applications via the above-described network such as the Internet 50, and therefore, is capable of transmitting application-purpose electronic documents to this application destination server 60, and also capable of receiving/transferring processed results thereof.

In the memory 11, several programs which constitute a genuineness management program has been stored. These programs contain an electronic application program 12, a digital-signature applying program 13, a digital-signature certifying program 14, a print program 15 for printing an electronic document with a digital signature, and a capture program 16 for capturing a paper document containing a digital watermark. Also, the computer 10 is equipped with a document storage unit 17 functioning as a storage unit which may store thereinto an electronic document (electronic data) to be processed, and image data acquired for a print medium of this electronic document.

Among these programs, as indicated in FIG. 2 and FIG. 3, it is so assumed that the electronic application program 12 mainly plays both a role of such an interface that operations by the above-described deputy are accepted and, on the other hand, various sorts of processed results are transmitted to the application destination server 60; and also another role of a main program which may control entire ports of other programs.

In this case, a flow operation of electronic application will now be explained with reference to FIG. 19 and FIG. 20. FIG. 19 is a diagram for representing a sequential operation example (first time) of an electronic application procedure according to this embodiment. FIG. 20 is a diagram for indicating a sequential operation example (next time and succeeding times) of the electronic application procedure according to this element.

First, when an applicant (person who requests electronic application) of an electronic application entrusts a deputy (representative) with this electronic application, this applicant forms a power of attorney as an electronic document to which a digital signature has been given (step s2000). Otherwise, as shown in an example of FIG. 3, in the case that the applicant utilizes a mobile appliance (mobile gear) and the like so as to apply a digital signature via a network with respect to an electronic document, when the applicant entrusts this electronic application to a deputy, this applicant may make an electronic application even under such a condition that a digital signature has not yet been given. The depty files the electronic application via the application destination server 60 by using the above-described electronic application program 12, and forms a power of attorney and a copy of electronic document such as an application form (step s2001). Also, this deputy prints both the power of attorney and the copy of the electronic document as paper duplicates by using the print program 15 for printing the electronic document having the digital signature, and then passes the paper duplicates to the above-described applicant (step s2002).

On the other hand, after the first-time application has been accomplished, process operations after a second-time application will be carried out as follows: First, the applicant passes the paper duplicate owned by himself to the deputy as an attached document in order to ask this deputy to file an application (step s2100). On the other hand, the deputy certifies a genuineness by using the capture program 16 for capturing the paper document having the digital watermark, and then forms an electronic document equipped with a digital signature from the above-explained paper duplicate (step s2101). Also, this deputy files an electronic application while the above-described electronic document equipped with the digital signature is employed as the attached document, and forms a duplicate of this electronic document (step s2102). This duplicate of the electronic document is stored in the document storage unit 17, and on the other hand, is print-processed as a paper duplicate by executing the print program 15 for printing the electronic document having the digital signature. Then, this printed paper duplicate is passed to the applicant (step s2103).

Also, such a process operation that electronic data which constitutes an electronic document is captured so as to execute the genuineness management method according to this embodiment and then the processed electronic data is outputted to a print medium such as paper may be carried out by the print program 15 for printing the electronic document with the digital signature. This print medium (for example, paper document) is given as a paper duplicate of the electronic application to the applicant. On the other hand, the print medium to which the electronic document has been outputted may constitute a subject to be processed by an image capturing process, and also by the capture program 16 for capturing the paper document with the digital signature, which executes a genuineness certification based upon the data captured by this image capturing process.

In addition, the genuineness management system is provided with a digital signature certification program 14 for certifying a digital signature applied to an electronic document, and also, a digital signature applying program 13 for applying program 13 for applying a digital signature to an electronic document by receiving an instruction issued from, for example, the mobile terminal of the application as shown in FIG. 3.

It should be understood that when the computer 10 manages various sorts of identification information such as encrypt keys and electronic identificates of applicants in a batch manner, for instance, as to digital signatures made based upon the public key cryptosystem technique in the public key infrastructure(PKI), various sorts of process operations capable of guaranteeing that public keys are genuine may be executed only by the computer 10. On the other hand, the computer 10 may issues a process request for certificating digital signature to a certification station (CA), and may acquire/utilize a result of this process request.

In addition to the above-described structures, the computer 10 is equipped with a printer 30 in order to output an electronic document to a print medium such as paper. Alternatively, this computer 10 is connected via a network to the printer 30. Also, the computer 10 is similarly equipped with an image scanner 40 capable of capturing image data of an electronic document outputted on a print medium, or may be alternatively connected to this image scanner 40 via a network.

It should also be noted that the computer 10 (information processing apparatus) functioning as the genuine management system may be provided with the CPU 19, the I/O 18, the communication unit 20, and the memory 11 in an integral form, or may be realized by other apparatus which are coupled via a network to this computer 10 in order that these units may be used.

Also, it should be understood that as apparatus capable of functioning as the above-described computer 10, any other apparatus may be employed if these apparatus are equipped with both calculation functions and input/output functions capable of realizing the process operations executed based on the genuineness management method of the present invention, and also proper storage apparatus. For instance, other than a personal computer, any of electronic appliances equipped with computer chips may be employed. These computer chips may cover a network-connectable portable terminal, a PDA, a game machine, and a digital TV.

Further, it should be understood that the respective programs 12, 13, 14, 15, and 16 stored in the above-explained memory 11 may organically function as such programs which are separately installed in individual storage apparatus connected to each other via a network, or may be collected to be stored in a single storage apparatus.

Furthermore, with respect to a network which connects the computer 10 to the application destination server 60, various sorts of networks such as a LAN (Local Area Network), a WAN (Wide Area Network), a leased line, a power-line network, and a wireless network may be employed other than the Internet 50 shown in FIG. 1. Also, when virtual dedicated network techniques such as VPN (Virtual Private Network) is employed, such communications capable of improving security aspects in the Internet may be established and suitable. Apparently, this application example of networks may be similarly applied also to connection modes among the computer 10, the printer 30, and the image scanner 40.

Figure 4A:
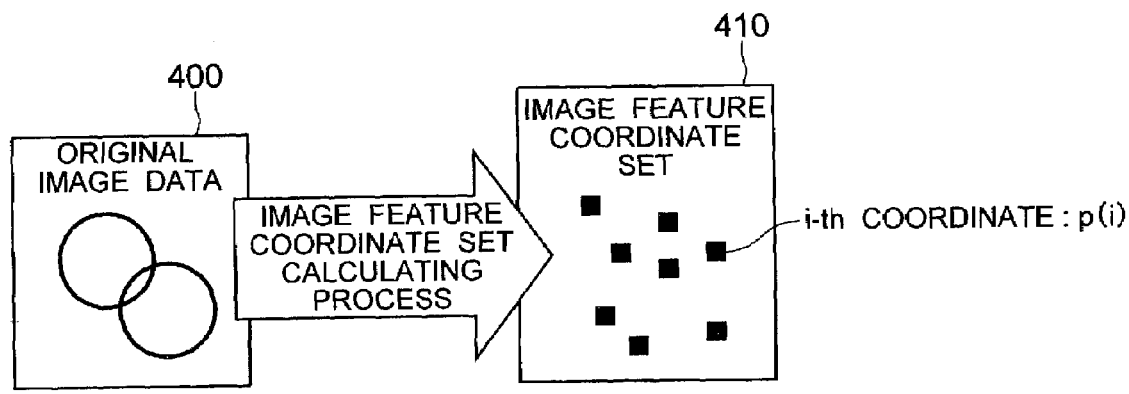
FIGS. 4A, 4B, 4C are diagrams for representing a conceptional idea of a digital waterprint inserting method according to an embodiment of the present invention.
Figure 4B:
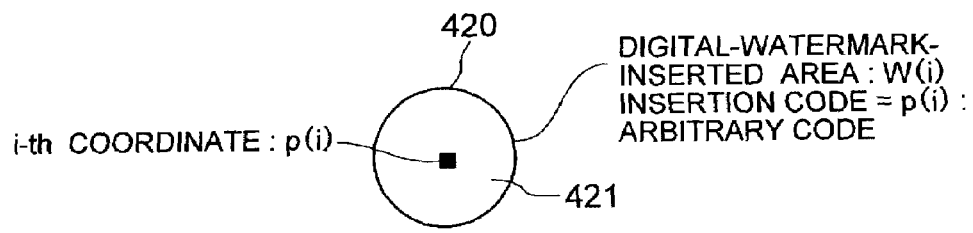
Figure 4C:
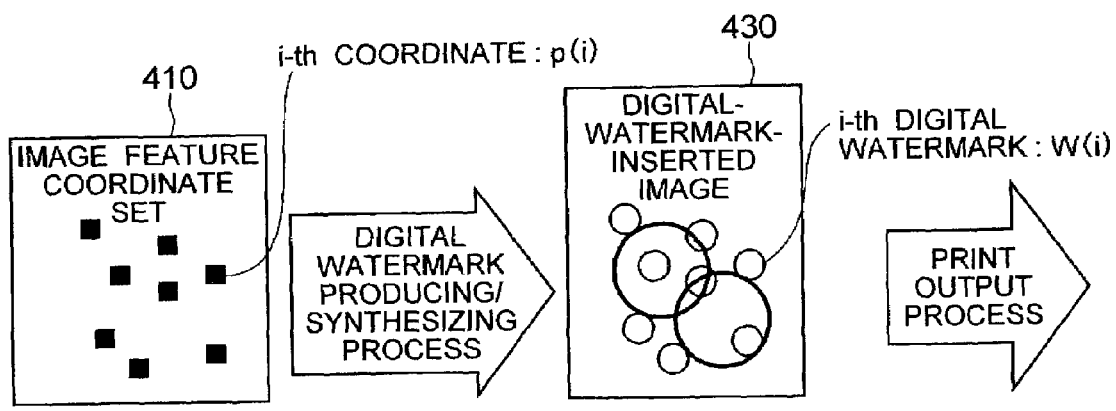

FIGS. 4A, 4B, 4C are diagrams for illustratively showing a conceptional idea of a digital watermark inserting method according to this embodiment. In the genuineness management method of this embodiment, an inserting (embedding) process operation of a digital watermark, and a detecting/certifying process operation of this digital watermark are carried out with respect to image data which is contained by an electronic document. In this inserting method, a coordinate set within image data where digital watermarks are arranged is defined as an "image feature coordinate set." While this coordinate set 410 symbolizes a certain feature of original image data 400, such an idea is conceivable that if original image data 400 becomes different from each other, then different coordinate sets are produced. Also, in view of strengths of digital watermarks, even when image data contained in electronic documents are processed by way of the output process operations to paper and the capture process operations by the image scanner, the same coordinate sets are obtained, so that allowable characteristics may become superior with respect to distortions of captured images and capture errors.

As a consequence, for instance, while an extraction condition of an image feature such as a specific color, a specific lightness, a specific saturation, or a shape of a pixel set is previously determined, since this extraction condition of the image feature is applied to either image data containing an electronic document or this image data formed on a print medium, a coordinate set corresponding to either pixels or the pixel set which constitute this image feature is calculated as the image feature coordinate set. As exemplified in FIG. 4A, the image feature coordinate set 410 obtained from the original image data 400 is constituted by a plurality of coordinates, and an insertion code is embedded into a digital watermark inserting region 420 which contains, for example, each of coordinates (namely, i-th coordinate "p(i)" 421 in this drawing) and a peripheral area of this coordinate (see FIG. 4B).

As this insertion code, at least a coordinate value among coordinate values and pixel color values, which correspond to the respective coordinates constituting the image feature coordinate set 410, is employed. Also, as a measure capable of avoiding the read error used when the capturing process operation is carried out, all of the insertion codes embedded into the respective feature coordinates are not made identical to each other, but such an insertion code may be alternatively employed which is produced from both this coordinate value and an arbitrary value. As a result, when the capturing process operation is carried out, three sets of coordinate values are compared with each other, and thus, matching characteristic of these coordinate values may be certified. These three coordinate values contain a feature coordinate value which is re-calculated from image data, a coordinate value which is detected from a digital watermark, and a coordinate value which is embedded as a digital watermark while the capturing process operation is carried out.

As previously explained, the digital watermark is produced in response to the coordinate set 410, and then this digital watermark is embedded into the original image data 400, so that a digital-watermark-inserted image 430 is formed. The formed digital-watermark-inserted image 430 is processed by the output process operation in combination with other text data and the digital signature, which constitute the electronic document (see FIG. 4C). It should be noted that if a hash function is applied to at least the coordinate value among the coordinate values and the pixel color values so as to produce such a hash value originated from the image data, and then, this hash value is contained in an arbitrary code of the above-described digital watermark, security of the digital watermark may be improved, and may provide suitable results. Alternatively, another hash value of another portion (text data and digital signature) of the electronic document may be merged into the above-described hash value. The above-described process operations related to the digital watermark inserting operation is executed by, for instance, the above-explained print program 15 for printing the electronic document having the digital signature in this embodiment.

FIG. 5 is a diagram for illustratively showing a conceptional idea of a digital watermark detecting/certifying method according to this embodiment of the present invention. Next, a description will now be made of a digital watermark detecting/certifying process operation executed in the genuine management method of this embodiment. As a condition for detecting/certifying a digital watermark, such a condition may be predicted. That is to say, image data is captured by the image scanner 40 from a print medium such as a paper document on which an electronic document is outputted, and then, an original electronic document is reconstructed. As a consequence, as exemplified in the example of FIG. 5, with respect to a paper document on which the digital-watermark-inserted image 43 of FIG. 4 has been outputted, the reading process operation (capture process operation) made by the image scanner 40 is carried out so as to acquire another digital-watermark-inserted image 500.

The computer 10 applies the above-described predefined extraction condition of the image feature to be considered to the digital-watermark-inserted image 500 which has been acquired by the image capturing process operation, so that a reference coordinate set 520 corresponding to either the pixels or the pixel set, which constitute this image feature, is calculated. It should be noted that this reference coordinate set 520 is merely defined an image feature coordinate set in this drawing. Assuming now that the digital watermark has been embedded into either the respective coordinates "P" or a peripheral region thereof, which constitute this reference coordinate set 520. The computer 10 searches a predetermined area located around this reference coordinate "P" as a center in order to detect the digital watermark.

The computer 10 which has acquired a detection result 510 of the embedded digital watermark recognizes a coordinate set 530 of this digital watermark.

Also, this computer 10 recognizes at least the embedded coordinate value among the embedded coordinate values and the pixel color values of each of the detected digital watermarks, and extracts both the reference coordinate "P" and an embedded coordinate value "Q" of such a digital watermark coordinate "q" whose coordinate value is located within a predetermined error range, so that an embedded coordinate set 540 is produced by the computer 10. The computer 10 produces a hash value originated from an embedded coordinate, and then, compares this produced hash value with the hash value which is recognized based upon the certification data outputted on the print medium in order to certify as to whether or not the image data is altered. The above-described process operation related to the detecting/certifying operations of the digital watermark is executed by, for example, the capture program 16 for capturing the digital-watermark-inserted paper document.

Figure 6:
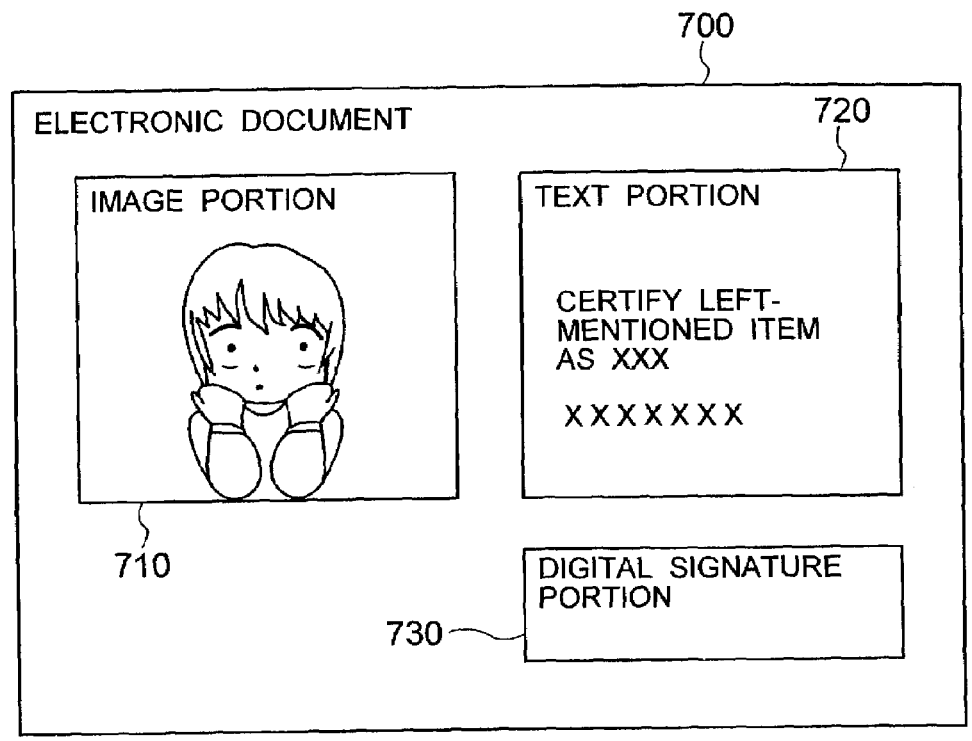
FIG. 6 is a diagram for indicating a display screen example of an original electronic document according to an embodiment of the present invention.

FIG. 6 is a diagram for illustratively representing a display screen example of an original electronic document according to this embodiment. If an original electronic document 700 obtained before an electronic watermark has been embedded corresponds to, for instance, personal identification information as shown in FIG. 6, then this original electronic document 700 may be constituted by an image portion 710 in which a face image of this person is arranged, a text portion 720 in which an identification content is described, and a digital signature portion 730 in which digital signature data is arranged.

Figure 7:
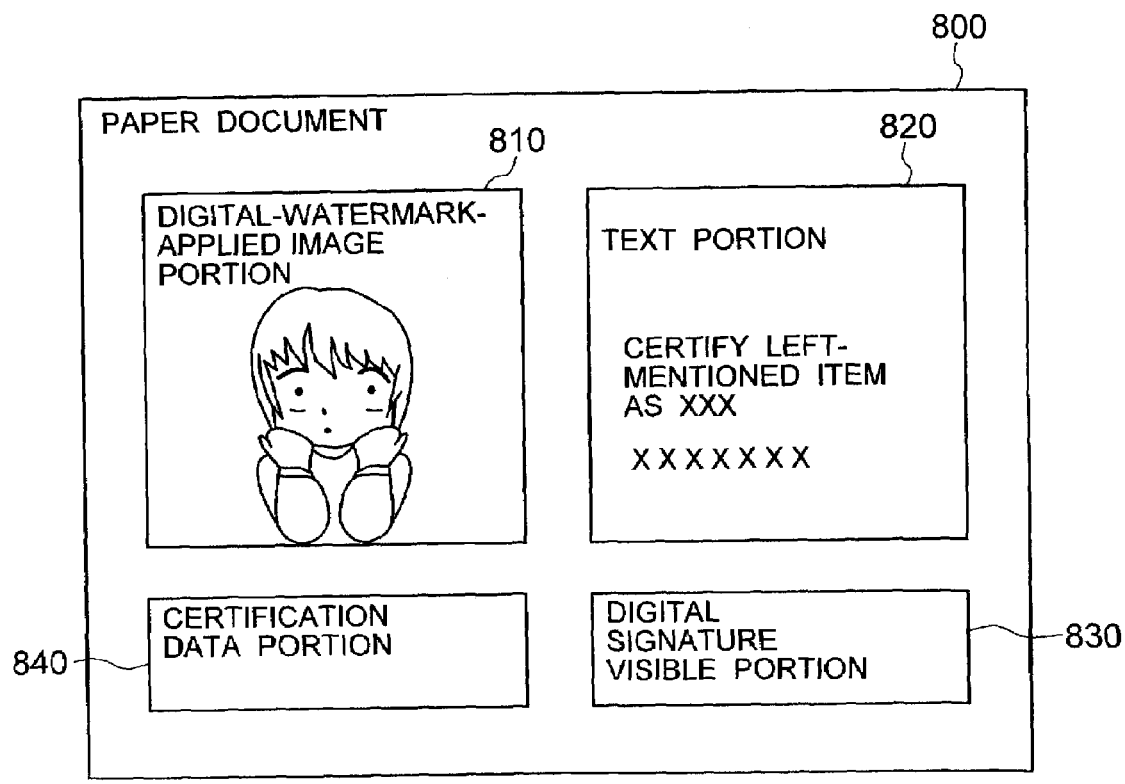
FIG. 7 is a diagram for indicating a layout example of a print medium on which the electronic document of this embodiment is outputted.

FIG. 7 is a diagram for illustratively indicating a layout example of a print medium on which an electronic document is outputted, according to this embodiment. As previously explained, in such a case that the digital water embedding process operation has been carried out and the output process operation with respect to the print medium (will be referred to as "paper document" hereinafter) of the electronic document containing this image data, a paper document 800 in which such a layout shown in FIG. 7 can be expected has no specific change from the above-described face image at a glance. However, as explained above, this paper document 800 is constituted by a digital-watermark-applied image portion 810, a text portion 820, a certification data portion 840, and a digital signature visible portion 850. In the digital-watermark-applied image portion 810, the face image into which the digital watermark has been embedded as explained above is arranged. In the certification data portion 840, certification data is arranged which is produced from an image feature coordinate, text data, and a hash value originated from a digital signature. In the digital signature visible portion 850, a visible digital signature (namely, attribute information thereof) is arranged. It should also be understood that this paper document 800 may have a similar layout to a layout of such an electronic document obtained in the case that the electronic document is reconstructed through the capture process operation by the image scanner 40. It should also be understood that both a "digital-watermark-inserted image" and a "digital-watermark-applied image portion" imply such image data into which digital watermark has been embedded, and therefore, have the same implications.

Figure 8:
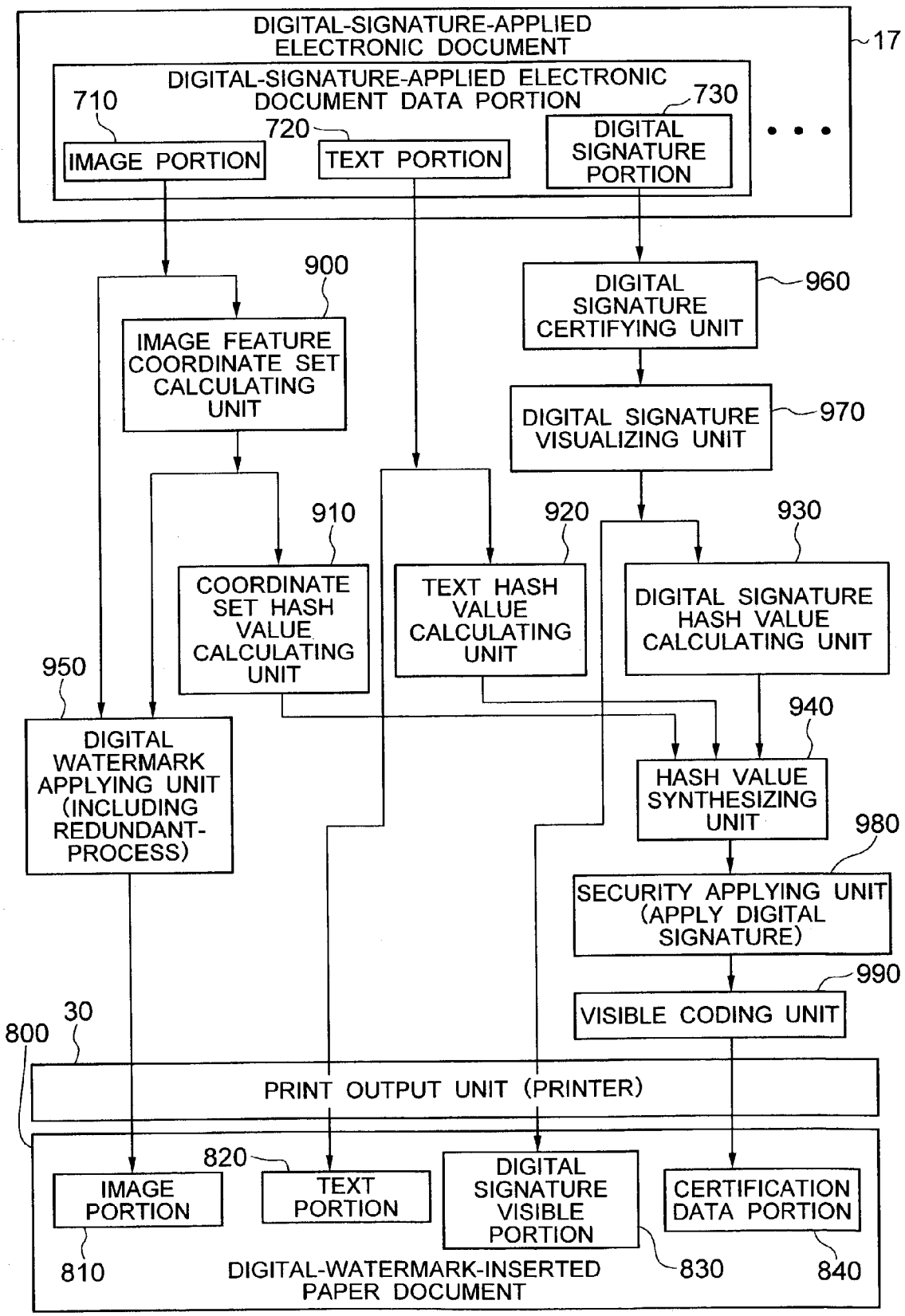
FIG. 8 is a diagram for representing a print tool (print tool) for an electronic document with a digital watermark according to an embodiment of the present invention.
Figure 9:
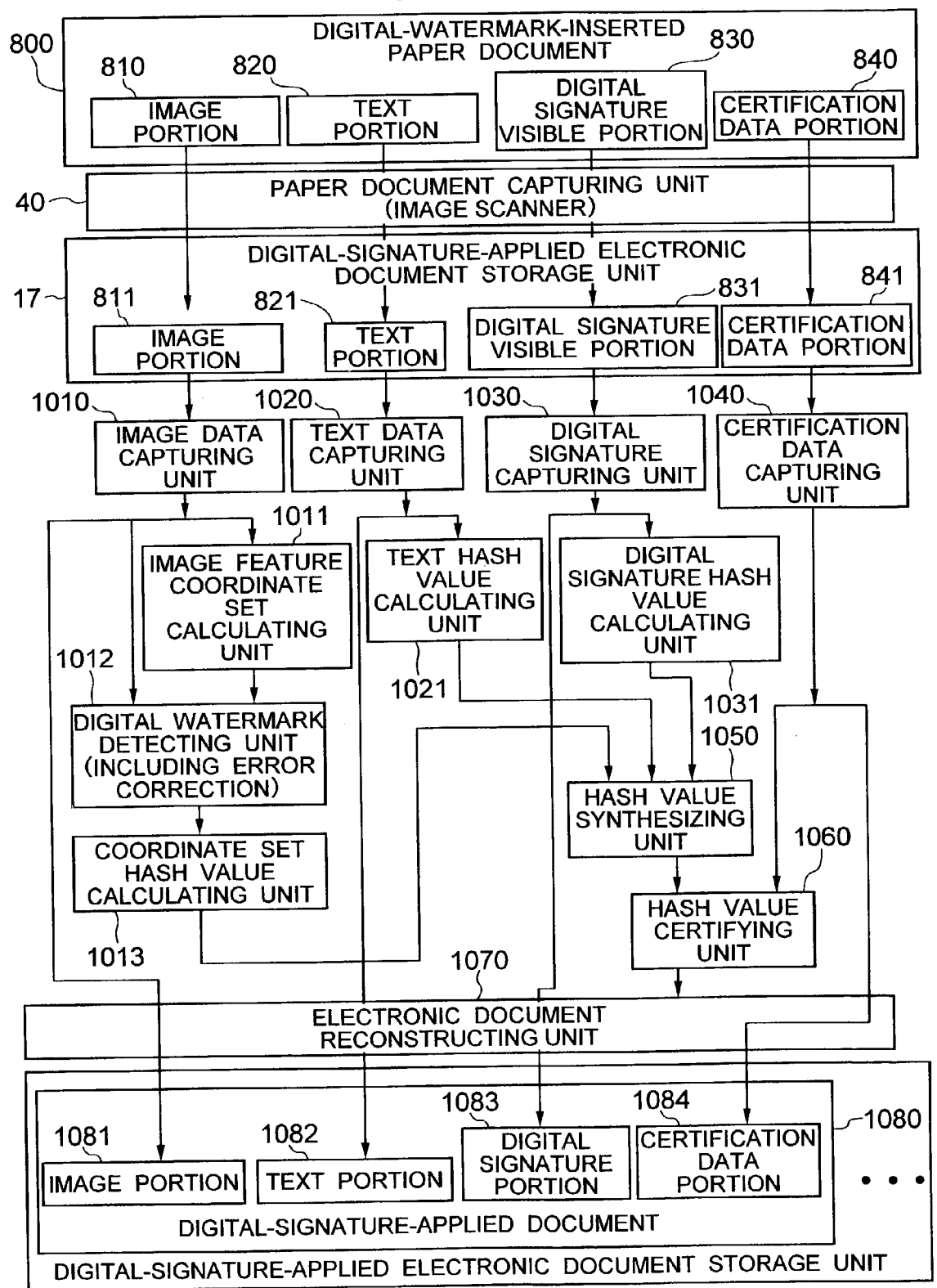
FIG. 9 is a diagram for indicating a capture tool (capture tool) for a paper document with a digital watermark according to an embodiment of the present invention.

FIG. 8 is a block diagram for representing a print tool for printing an electronic document with a digital signature (print tool) according to this embodiment. FIG. 9 is a block diagram for showing a digital-signature-inserted paper document capturing tool (capture tool) according to this embodiment. Since descriptions about "- - - units" such as an image feature coordinate set calculating unit and a coordinate set hash value calculating unit, which are described as to the respective functions within these tools, are assumed as the similar implications as either algorithms or apparatus produced by embodying these algorithms which may play the above-explained respective functions with respect to the respective programs 12 to 16, explanations thereof are omitted in the following descriptions.

Figure 10:
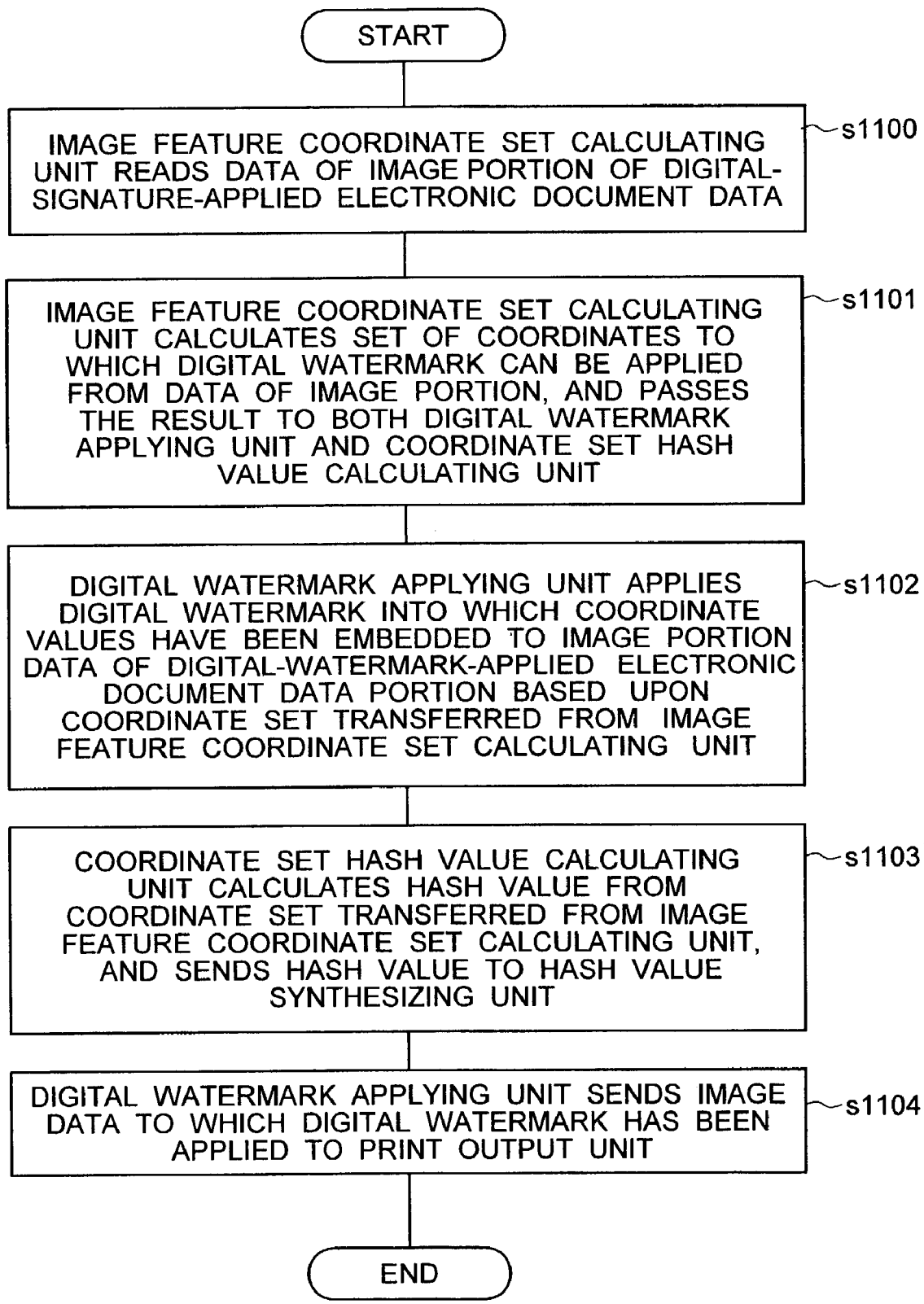
FIG. 10 is a diagram for indicating an example of an image processing sequential operation by the print tool in the genuineness management method of this embodiment.

Next, concrete processing sequential operations of the genuineness management method according to this embodiment will now be explained with reference to flow charts of FIG. 10 to FIG. 14 in connection with the print tool of FIG. 8. FIG. 10 is a flow chart for describing an example of image processing sequential operations executed by the print tool in the genuineness management method according to this embodiment. First, it is so assumed that the above-described document storage unit 17 in the computer 10 contains a storage unit of an electronic document with a digital signature. As a consequence, both the electronic document storage unit and the digital-signature-applied electronic document storage unit may be made by the same storage apparatus. It is so assumed that the electronic document 700 with the digital signature containing the above-described image portion 710, text portion 720, and digital signature portion 730 has been stored in this digital-signature-applied electronic document storage unit.

Thus, in accordance with the digital-signature-applied electronic document printing program 15 of the computer 10, an image feature coordinate set calculating unit 900 reads out data as to the image portion 710 of the digital-signature-applied electronic document 700 (step s1100). The image feature coordinate set calculating unit 900 calculates a set of coordinates to which a digital watermark can be applied (namely, image feature coordinate set) from the data of the image portion 710, and then passes this image feature coordinate data to both the digital watermark applying unit 950 and the coordinate set hash value calculating unit 910 (step s1101).

The digital watermark applying unit 950 applies such a digital watermark to the data of the image portion 710 of the digital-signature-applied document 700, while the respective coordinate values have been embedded into this digital watermark based upon the coordinate set passed from the image feature coordinate set calculating unit 900 (step s1102). It should also be noted that when a pixel color value is also contained as the embedding information, precision may be increased, and thus, a suitable result may be obtained. On the other hand, the coordinate set hash value calculating unit 910 applies a proper hash function to the coordinate set transferred from the image feature coordinate set calculating unit 900 so as to calculate a hash value thereof, and then, sends this calculated has value as an hash value originated from the image data to a hash value synthesizing unit 940 (step S1103). Also, the digital-watermark-applying unit 950 sends image data to which the digital watermark has been applied to the print output unit 30 (step s1104).

It should also be noted that an index number for specifying a coordinate value may be employed as a code of a digital watermark instead of the coordinate value. In this alternative case, a table which may establish a correspondence relationship between feature coordinates and indexes is stored in the memory 11 of the computer 10. A bit length may be made short by such an index number. Also, the table itself may be outputted as a portion of the identification data.

FIG. 11 is a flow chart for indicating an example of text processing sequential operations executed by the print tool in the genuineness management method according to this embodiment. Although the image portion 710 contained in the digital-signature-applied electronic document 700 is processed in the above-explained manner, the text portion 720 will be processed as follows: A text hash value calculating unit 920 reads out data of the text portion 720 of the digital-signature-applied electronic document 700 (step s1201). The text hash value calculating unit 920 applies a hash function to the read data of the text portion 720 so as to calculate a hash value, and transmits this calculated hash value as a hash value originated from the text data to a hash value synthesizing unit 940 (step s1202).

FIG. 12 is a flow chart for indicating an example of digital signature processing sequential operations executed by the print tool in the genuineness management method according to this embodiment. Similar to the above process operation, process operations as to the digital signature will now be explained. A digital signature certifying unit 960 sends the data of the digital signature portion 730 of the digital-signature-applied document 700 to a digital signature visualizing unit 970, and also certifies a validity of a digital signal (step s1300). When the digital signature certifying unit 960 judges that this digital signature is invalidated ("NO" in step s1301), this process operation is ended. On the other hand, when the digital signature certifying unit 970 judges that the digital signature is valid (YES in step s1301), the digital signature visualizing unit 970 converts attribute information of this digital signature into data having a text format, and then, transmits the data having the text format to both the digital signature hash value calculating unit 930 and the print output unit 30 (step s1302).

On the other hand, the digital signature hash value calculating unit 930 calculates a hash value from the data having the text format transmitted from the digital signature visualizing unit 970, and then, sends this calculated hash value as a hash value originated from the digital signature to a hash value synthesizing unit 940 (step s1303).

FIG. 13 is a flow chart for indicating an example of certification data sequential operations executed by the print tool in the genuineness management method according to this embodiment. The hash value synthesizing unit 940 synthesizes the hash values with each other, which are sent from the coordinate set hash value calculating unit 910, the text hash value calculating unit 920, and the digital signal hash value calculating unit 930, so as to calculate a new hash value (namely, synthesized hash value), and then, sends this new hash value to a security applying unit 980 (step s1400).

The security applying unit 980 applies a digital signature (encrypted) to the hash value sent from the hash value synthesizing unit 940, and sends the digital-signature-applied hash value to a visible coding unit 990 (step s1401). The visible coding unit 990 converts the data sent from the security applying unit 980 into a visible pattern (visible certification pattern) which may be readable by a computer such as a bar code, and then produces visible certification data. This visible certification data is printed out via a print output unit 30 as the certification data portion 840 of the digital-watermark-inserted paper document 800 (step s1402). It should also be noted that this visible coding unit 990 executes such a process operation that either a bar code or a two-dimensional bar code is converted into a dump list which may be electronically and easily read when these bar codes are printed on paper, or may-be readable by an OCR (optical code reader).

FIG. 14 is a flow chart for indicating an example of printing process sequential operations executed by the print tool in the genuineness management method according to this embodiment. As previously explained, various sorts of data which have been obtained as output data to a digital-watermark-inserted paper document (print medium) are outputted to the print medium in the print out unit 30. Upon receipt of an output instruction issued from the computer 10, this print output unit 30 prints out such an image data as the image portion 810 of the digital-watermark-inserted paper document 800 (step S1500). This image data to which the digital watermark has been applied is sent from the digital watermark applying unit 950. Similarly, the print out unit 30 prints the data of the text portion 720 of the digital-signature-applied document 700 as the text portion 820 of the digital-watermark-inserted paper document 800 (step s1501). Similarly, the print output unit 30 prints out the data sent from the digital watermark visualizing unit 970 as the digital-signature-visualized portion 830 of the digital-watermark-inserted paper document 800 (step s1502). Similarly, the print output unit 30 prints out pattern visible certification data sent from the visible coding unit 990 as the certification data portion 840 of the digital-watermark-inserted paper document 800 (step s1503).

Figure 15:
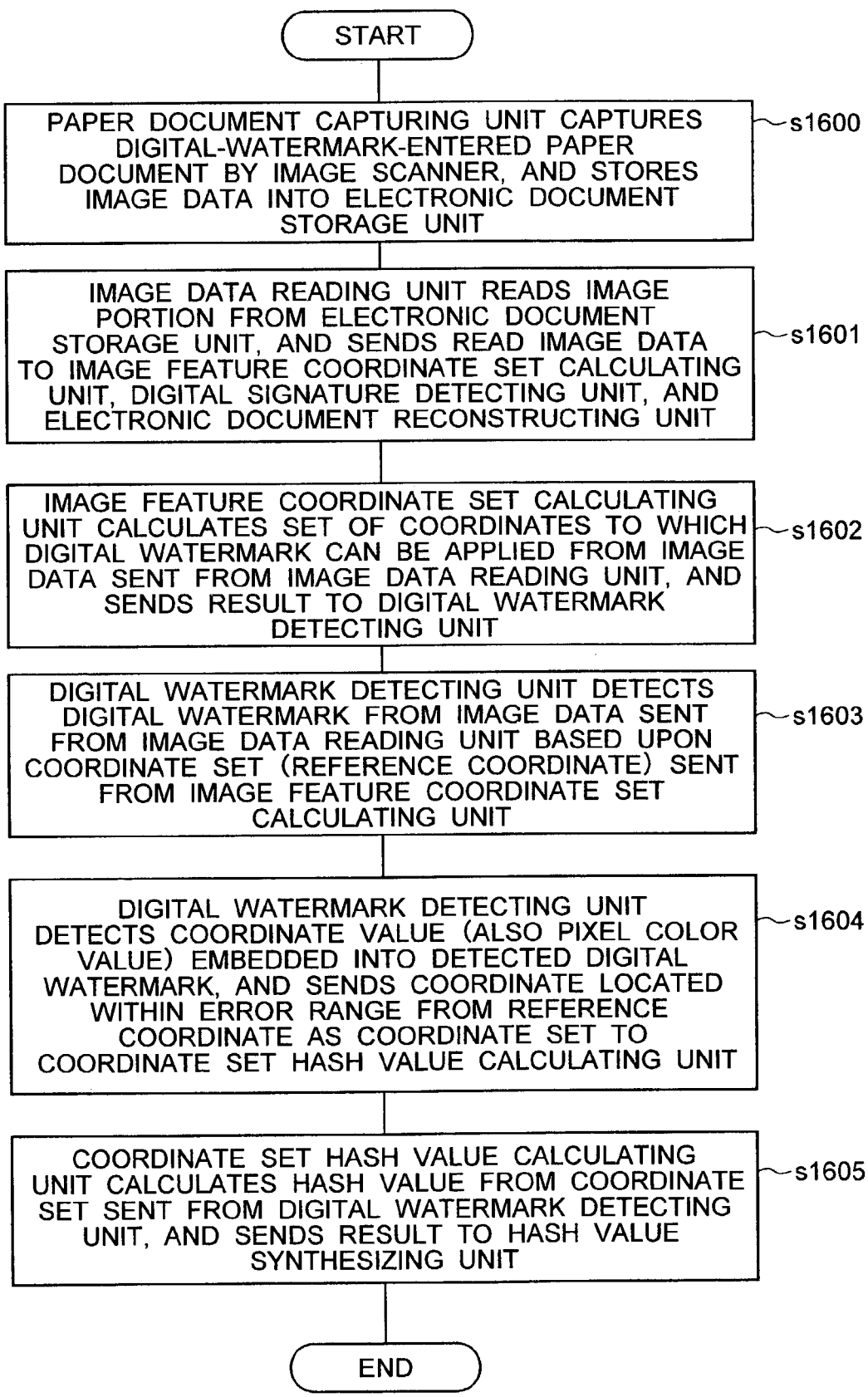
FIG. 15 is a diagram for indicating an example of an image processing sequential operation by the capture tool in the genuineness management method of this embodiment.

Next, a description will now be made of process operations in accordance with flow charts of FIG. 15 to FIG. 18 in connection with the capture tool of FIG. 6. FIG. 15 is a flow chart for describing an example of image processing sequential operations executed by the capture tool in the genuine management method of this embodiment. In the case that the above-described digital-watermark-inserted paper document 800 is used as, for example, an attached document employed in an electronic application, a deputy (or application destination server 60 etc.) who executes the electronic application on behalf of an applicant performs a capturing process operation by the image scanner 40. In this case, the paper document capturing unit 40 (image scanner) executes the capturing process operation with respect to the digital-watermark-inserted paper document 800, and then stores the captured image data thereof into the electronic document storage unit 17 (step s1600). Alternatively, while such a table is stored in the memory 11 of the computer 10 and this table establishes a corresponding relationship between sort numbers equal to image formats and a set of coordinate values of an image area range which is processed as an image after a capturing process operation of a paper document has been carried out, a relevant area range may be recognized as image data with reference to this table and this recognized image data may be stored in the electronic document storage unit 17.

An image data capturing unit 1010 captures an image portion 811 from the electronic document storage unit 17, and then transfers this captured image data to an image feature coordinate set calculating unit 1011, a digital watermark detecting unit 1012, and an electronic document reconstructing unit 1070 (step s1601). The image feature coordinate set calculating unit 1011 calculates a set of coordinates (reference coordinate set) to which a digital watermark can be applied based upon the image data sent from the image data capturing unit 1010, and then sends this calculated reference coordinate set to a digital watermark detecting unit 1012 (step s1602).

The digital watermark detecting unit 1012 detects a digital watermark from the image data sent from the image data capturing unit 1010 based on the coordinate set (reference coordinate set) supplied from the image feature coordinate set calculating unit 1011 (step s1603). This digital watermark detecting unit 1012 detects a coordinate value (otherwise, and also pixel color value) which has been embedded in this detected digital watermark, defines an embedded coordinate value of a digital watermark coordinate located with an error range from the reference coordinate as an "embedded coordinate set", and then sends this embedded coordinate set to a coordinate set hash value calculating unit 1013 (step s1604).

The coordinate set hash value calculating unit 1013 calculates a hash value from the embedded coordinate set transferred from the digital watermark detecting unit 1012, and then sends this calculated hash value to a hash value synthesizing unit 1050 (step s1605).

Figure 16:
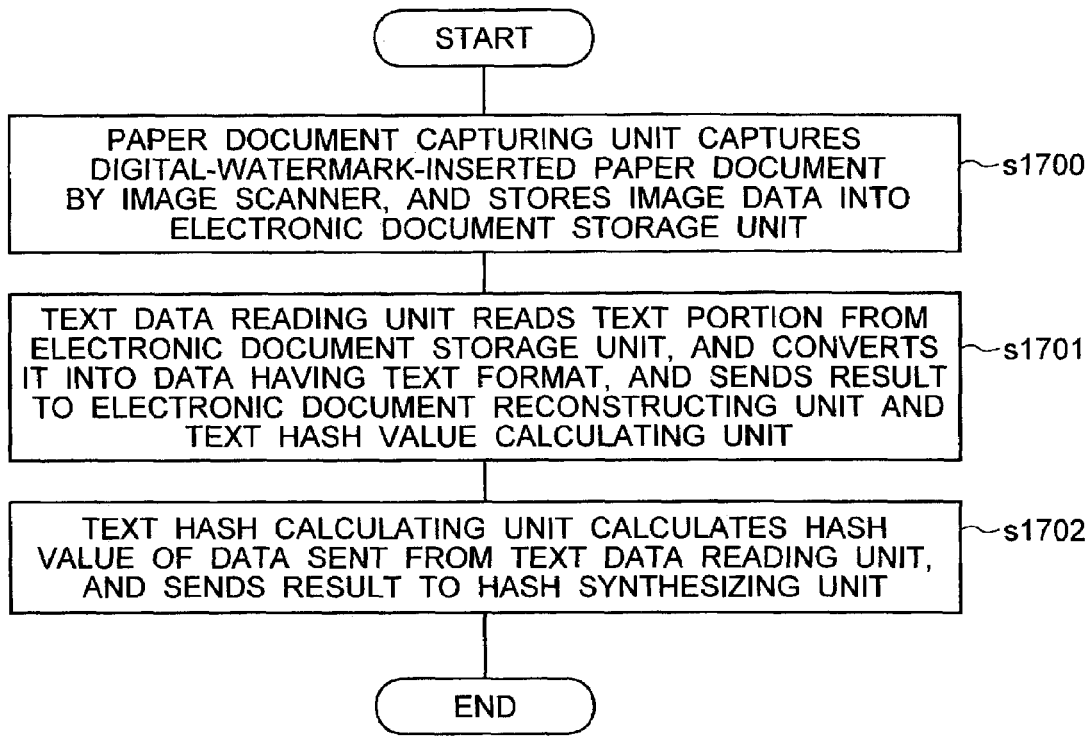
FIG. 16 is a diagram for indicating an example of a text processing sequential operation by the capture tool in the genuineness management method of this embodiment.

FIG. 16 is a flow chart for describing an example of text processing sequential operations executed by the capture tool in the genuine management method of this embodiment. Similarly, the paper document capturing unit 40 executes the capturing process operation with respect to the digital-watermark-inserted paper document 800, and then stores the captured image data thereof into the electronic document storage unit 17 (step s1700). While a table is stored in the memory 11 of the computer 10 and this table establishes a corresponding relationship between sort numbers equal to image formats and a set of coordinate values of a text area range, for example, to which an OCR should be applied as a result of the paper document capturing process operation, the computer 10 refers to this table. Alternatively, in response to a table referring result, the relevant area range may be stored as text data into the digital document storage unit 17. A text data capturing unit 1020 captures a text portion 821 from the electronic document storage unit 17, converts this captured text portion 821 into data having a text format, and then, sends this data having the text format to both the electronic document reconstructing unit 1070 and a text hash value calculating unit 1021 (step s1701).

The text hash calculating unit 1021 calculates a hash value of the data sent from the text data capturing unit 1020, and then, transfers this calculated hash value as a hash value originated from the text data to a hash value synthesizing unit 1050 (step s1702).

Figure 17:
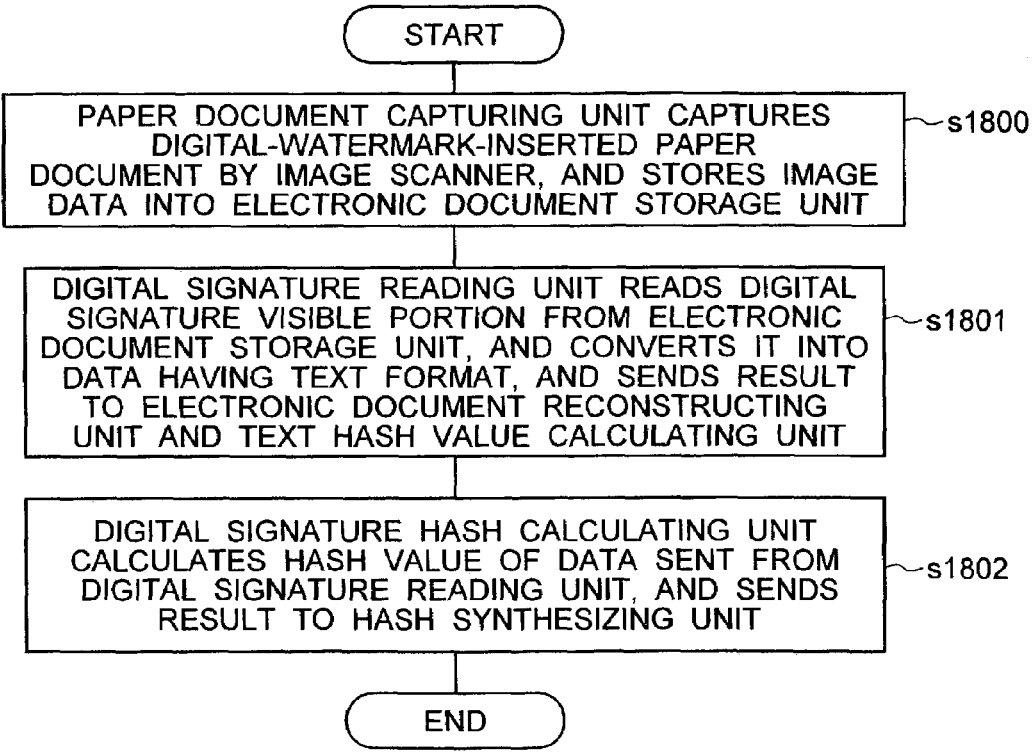
FIG. 17 is a diagram for indicating an example of a digital signature processing sequential operation by the capture tool in the genuineness management method of this embodiment.

FIG. 17 is a flow chart for describing an example of digital signature processing sequential operations executed by the capture tool in the genuine management method of this embodiment. Similarly, the paper document capturing unit 40 executes the capturing process operation with respect to the digital-watermark-inserted paper document 800, and then stores the captured image data thereof into the electronic document storage unit 17 (step s1800). A digital signature capturing unit 1030 captures a digital signature visible portion 831 from the electronic document storage unit 17, converts this captured digital signature visible portion 831 into data having a text format, and then, sends this data having the text format to both the electronic document reconstructing unit 1070 and the digital signature hash value calculating unit 1031 (step s1801).

The digital signature hash calculating unit 1031 calculates a hash value of the data sent from the digital signature capturing unit 1030, and then, transfers this calculated hash value as a hash value originated from the digital signature to the hash value synthesizing unit 1050 (step s1802).

Figure 18:
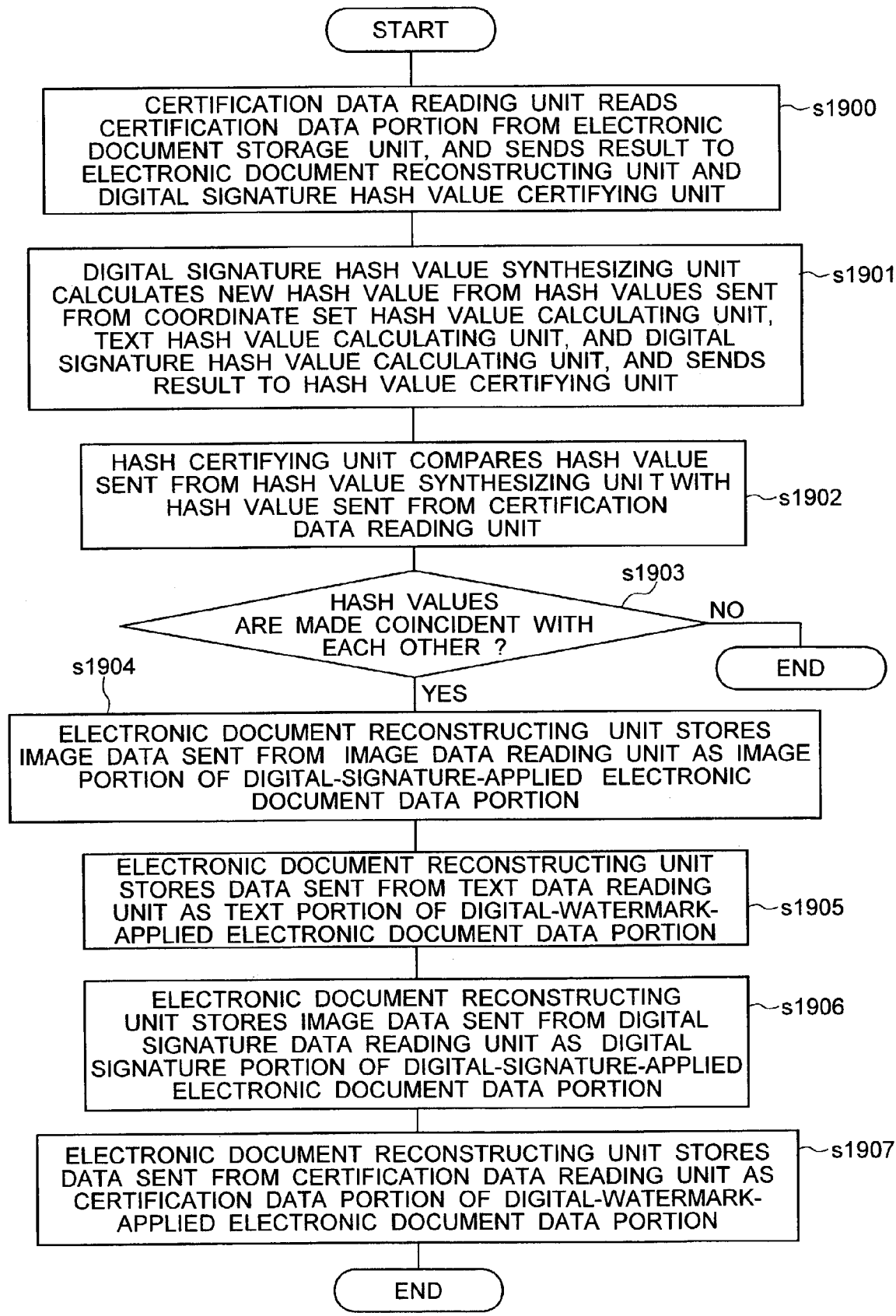
FIG. 18 is a diagram for indicating an example of a certification data processing sequential operation by the capture tool in the genuineness management method of this embodiment.

FIG. 18 is a flow chart for describing an example of certification data processing sequential operations executed by the capture tool in the genuine management method of this embodiment. On the other hand, a certification data capturing unit 1040 captures a certification data portion 841 from the electronic document storage unit 17, and then, sends the captured certification data portion 841 to both the electronic document reconstructing unit 1070 and a digital signature hash value certifying unit 1060 (step s1900).

On the other hand, a digital signature hash value synthesizing unit 1050 calculates a new hash value from the hash values which are sent from the coordinate set hash value calculating unit 1013, the text hash value calculating unit 1021, and the digital signature hash value calculating unit 1031 so as to produce a synthesized hash value originated from the captured data. This synthesized hash value is transmitted to a hash value certifying unit 1060 (step s1901).

The hash certifying unit 1060 identifies both the synthesized hash value originated from the captured data which is sent from the hash value synthesizing unit 1050 and the hash value sent from the certification data capturing unit 1040 (step s1902). When the hash certifying unit 1060 judges that the synthesized hash value is not made coincident with the transmitted hash value ("NO" in step s19083), the process operation is ended. On the other hand, when the hash certifying unit 1060 judges that the synthesized hash value is made coincident with the transmitted hash value ("YES" in step s1903), this hash certifying unit 1060 can recognize that the digital-watermark-inserted paper document 800 is not altered. At this time, the electronic document reconstructing unit 1070 stores the image data transferred from the image data capturing unit 1010 into the digital-signature-applied electronic document storage unit 17 as an image portion 1081 of a digital-signature-applied electronic document 1080 (step s1904). Similarly, this electronic document reconstructing unit 1070 stores the text data transferred from the text data capturing unit 1020 into the digital-signature-applied electronic document storage unit 17 as a text portion 1082 of the digital-signature-applied electronic document 1080 (step s1905). Furthermore, the electronic document reconstructing unit 1070 stores the digital signature data transferred from the digital signature capturing unit 1030 into the digital-signature-applied electronic document storage unit 17 as a digital signature portion 1083 of the digital-signature-applied electronic document 1080 (step s1906). Similarly, this electronic document reconstructing unit 1070 stores the certification data transferred from the certification data capturing unit 1040 into the digital-signature-applied electronic document storage unit 17 as a certification portion 1084 of the digital-signature-applied electronic document 1080 (step s1907).

Figure 21:
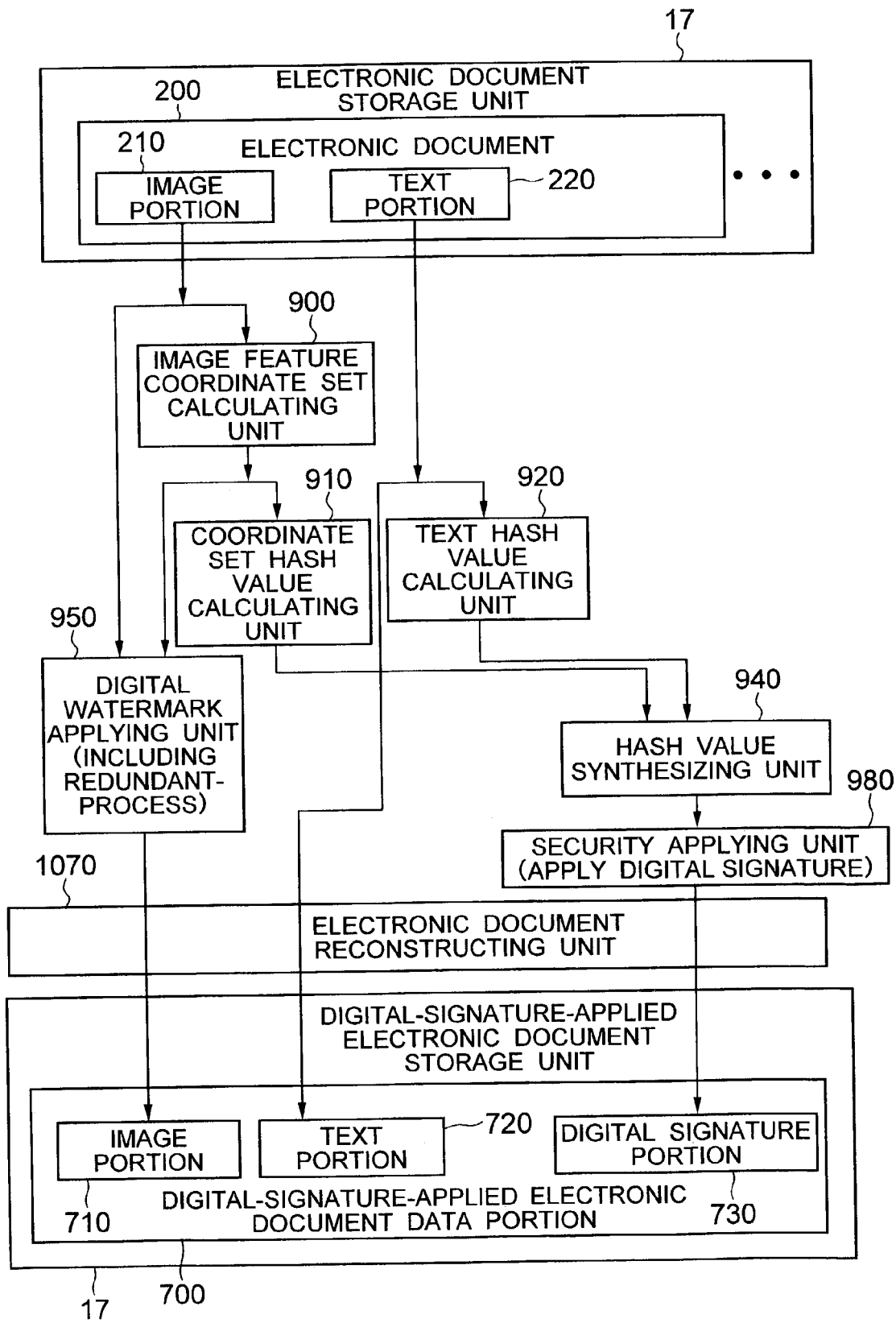
FIG. 21 is a diagram for showing a digital signature applying tool according to another embodiment of the present invention.

FIG. 21 is a block diagram for showing a digital-signature-applying tool according to another embodiment of the present invention. In this case, it is so assumed that an electronic document 200 has been stored in the electronic document storage unit 17. In processing sequential operations of this embodiment, in accordance with the digital-signature-applying program 13 equipped in the computer 10, an image feature coordinate set calculating unit 900 calculates a set of coordinates (image feature coordinate set) into which a digital watermark can be inserted based upon data of an image portion 210 of the electronic document 200, and then, sends this calculated coordinate set to both a digital watermark applying unit 950 and a coordinate set hash value calculating unit 910. The digital watermark applying unit 950 inserts digital watermarks into which coordinate values have been embedded in the image portion 210 of the electronic document 200 based upon the coordinate set sent from the image feature coordinate set calculating unit 900, and then, sends the resulting image portion 210 of the electronic document 200 to the electronic document reconstructing unit 1070. It should also be noted that if a pixel color value is contained as the information which is embedded into the digital watermarks, then detection precision may be increased, resulting in a suitable effect.

The coordinate set hash value calculating unit 910 applies a hash function to the image feature coordinate set sent from the image feature set calculating unit 900 so as to calculate a hash value, and then, sends this calculated hash value to the hash value synthesizing unit 940. On the other hand, a text hash value calculating unit 920 calculates a hash value from the text data of the text portion 220 of the electronic document 200, and then sends this calculated hash value to the hash value synthesizing unit 940. This hash value synthesizing unit 940 calculates a new hash value based upon the hash value sent from the coordinate set hash value calculating unit 910 and the hash value sent from the test hash value calculating unit 920, and then transfers this new hash value to a security applying unit 980.

The security applying unit 980 applies a digital signature to the synthesized hash value sent from the hash value synthesizing unit 940, and sends the resulting synthesized hash value to the electronic document reconstructing unit 1070. The electronic document reconstructing unit 1070 stores the image data sent from the digital signature applying unit 950 as the image portion 710 of the digital-signature-applied electronic document 700. Similarly, the electronic document reconstructing unit 1070 stores the text data of text portion 200 of the electronic document 200 as the text portion 720 of the digital-signature-applied electronic document 700. Also, the electronic document reconstructing unit 1070 stores the data sent from the security applying unit 980 into the digital signature portion 730 of the digital-signature-applied electronic document 700. Subsequently, both sequential operations for constructing the digital-watermark-inserted paper document 800 from the digital-signature-applied electronic document 700, and also, sequential operations for capturing the image data from the digital-watermark-inserted paper document 800 so as to reconstruct a digital-signature-applied electronic document 1080 are similar to those of the above-described embodiment. It should also be noted that when a genuine characteristic as to the digital-signature-applied electronic document 1080 is identified, this embodiment owns such a technical different point from that of the above-described embodiment. That is to say, in this embodiment, the above-described hash certifying unit 1060 compares the synthesized hash value sent from the hash value synthesizing unit 1050 with the hash value calculated from the digital signature portion 1083 of the digital-signature-applied electronic document 1080, and then, transmits this comparison result to a certification result display unit (not shown). This certification result display unit corresponds to such an interface which displays the certification result sent from the hash certifying unit 1060 to the tool user (for instance, deputy). In this certification result display unit, as the display modes, contents of a dialog display and of a display of a digital signature portion may be changed, depending upon provision/not provision of alteration.

Also, the display screen example previously shown in FIG. 6 may be grasped by that the image portion 710 is replaced by a digital-watermark-applied image portion under such a condition that certification data is contained in a digital watermark itself so as to be processed. In the embodiment using the digital-signature-applying tool, in FIG. 7 where the print result of the previously explained electronic document is described, the certification data portion 840 may be merely handled as the digital signature visible portion 830 without being discriminated from the digital signature visible portion 830, and may be handled as such a structure equal to the structure of FIG. 6, namely the layout of the electronic document.

Also, similar to the previously explained example of FIG. 3, the following condition may be expected. That is, for instance, the applicant transfers an instruction of applying a digital signature to the computer 10 by using a mobile terminal, and so on, and thus, the computer 10 may apply the digital signature to an electronic document on behalf of the applicant.

In accordance with the embodiments of the present invention, while the genuine characteristic of the electronic document having the digital signature and the genuine characteristic of the print medium such as paper on which this electronic document has been printed are maintained, these electronic document and print medium can be mutually replaced with each other. In other words, although such a transition is made that the electronic document is changed into the paper document, and also, this paper document is recovered to the electronic document, the original security can be simply and firmly recovered. For instance, even when an electronic document has been once printed on a print medium, a digital watermark which constitutes a key of such a genuineness guarantee may be utilized without loosing a validity thereof. As a result, the genuine characteristic of the electronic document (including image) which has been printed on the print medium such as paper can be readily guaranteed.

Moreover, in the techniques such as digital watermarking techniques, even when algorithms related to security aspects are made of public specifications and are leaked, these digital watermarking techniques can own durability which necessarily requires very large amounts of calculations similar to such an algorithm as the RSA encryption. In other words, there is a small deterioration in security aspects.

Also, even when print media is realized, and/or electronic documents having digital signatures are realized, genuine characteristics thereof can be guaranteed, and also, these print media and electronic documents having the digital signatures can be mutually replaced with each other. Other various effects may be expected. That is, copies of application contents (corresponding to duplicates) may be stored in the form of electronic media, or in the form of paper, or both in the electronic media and paper. Also, a content-certified type document attachment may be realized in which a power of attorney may be electronically handled as an attached document.

While the various embodiments of the present invention have been described with reference to concrete examples, the present invention is not limited thereto, but may be modified without departing from the technical scope and spirit of the invention.

In accordance with the present invention, even when print media is realized, and/or electronic documents having digital signatures are realized, genuine characteristics thereof can be guaranteed, and also, these print media and electronic documents having the digital signatures can be mutually replaced with each other.

What is claimed is:

1. A genuineness management method for managing genuine characteristics of both an electronic document and a print medium thereof by using a computer, wherein:
said computer executes:
  a step for recognizing image data contained in the electronic document;
  a step for applying an extraction condition of an image feature which has been previously determined and must be considered to said recognized image data so as to calculate a coordinate set corresponding to either a pixel or a set of pixels, which constitute said image feature;
  a step for recognizing at least a coordinate value among coordinate values and pixel color values, which correspond to each of coordinates constituting said coordinate set, and for embedding said recognized coordinate value as a code of a digital watermark into either the pixel or the pixel set, which constitute said image feature, or into an area in the vicinity thereof;
  a step for applying a hash function to at least the coordinate value among the coordinate values and the pixel color values to produce a hash value originating from the image data;
  a step for recognizing text data contained in the electronic document;
  a step for applying a hash function to the text data to produce a hash value originating from the text data;
  a step for recognizing a first digital signature contained in the electronic document;
  a step for certifying validity of the first digital signature;

a step for applying a hash function to attribute information of the first digital signature to produce a hash value originating from the first digital signature;

a step for synthesizing the hash values originating from the image data, the text data, and the first digital signature to produce a synthesized hash value;

a step for giving a second digital signature to the synthesized hash value;

a step for converting the synthesized hash value into a computer readable visible pattern so as to produce visible certification data;

a step for applying the visible certification data to the electronic document to which the digital watermark embedding process operation has been executed; and a step for outputting the resulting electronic document to the print medium.

2. A genuineness management method as claimed in claim 1, further comprising:

a step for converting attribute information of a digital signature contained in said digital document into digital-signature-visible data; and a step for applying said digital-signature-visible data to the electronic document to which said digital watermark embedding process operation has been executed, and for outputting the resulting electronic document to the print medium.

3. A genuineness management method as claimed in claim 1, further comprising:

a step for applying a hash function to at least the coordinate value among said coordinate values and said pixel color values so as to produce a hash value originated from the image data; and a step for containing said produced hash value in said digital watermark code.

4. A genuineness management method as claimed in claim 1, further comprising:

a step in which said computer owns a storage unit, and executes an image capturing process operation with respect to the print medium to which the electronic document has been outputted;

a step for applying the extraction condition of the image feature which has been previously determined and must be considered to the image data captured by said image capturing process operation so as to calculate a reference coordinate set corresponding to either the pixel or the pixel set, which constitute said image feature;

a step for detecting a digital watermark contained in the image data based upon the respective coordinates which constitute said reference coordinate set so as to recognize said digital watermark coordinate set;

a step for recognizing at least an embedded coordinate value among the embedded coordinate values of said detected digital watermark and pixel color values thereof;

a step for extracting an embedded coordinate value of said detected digital watermark located within a predetermined error range of a reference coordinate so as to produce an embedded coordinate set;

a step for applying a hash function to at least a coordinate value among the coordinate values and the pixel color values, which constitute said embedded coordinate set, so as to produce a hash value originated from the embedded coordinate;

a step for identifying the hash value which is recognized based upon the visible certification data by said capturing process operation with said hash value of the embedded coordinate in order to judge as to whether or not said recognized hash value is made coincident with said hash value originated from said embedding coordinate; and a step in which if said recognized hash value is made coincident with said hash value as a result of said judgment, then an electronic document containing at least said image data is stored into said storage unit.

5. A genuineness management method as claimed in claim 4, further comprising:

a step for applying hash functions to both text data and a digital signature, respectively, which are captured by said image capturing process operation, so as to produce hash values; and a step for synthesizing both the produced hash value originated from the text data and the produced hash value originated from the digital signature with said hash value originated from said embedded coordinate in order to produce a synthesized hash value originated from said captured data; and a step for identifying said synthesized hash value originated from said captured data with said hash value recognized by said visible certification data in order to judge as to whether or not said synthesized hash value is made coincident with said recognized hash value.

6. A genuineness management method as claimed in claim 4, further comprising:

a step in which when said image capturing process operation is executed, formats of the respective data contained in said print medium to be captured are recognized;

a step for identifying said recognized format with a table which determines formats to be captured as image data;

a step for recognizing the image data to be captured by the image capturing process operation as a result of said identification; and a step for capturing an image with respect to said recognized image data.

7. A genuineness management system for managing genuine characteristics of both an electronic document and a print medium, comprising:

means for recognizing image data contained in the electronic document;

means for applying an extraction condition of an image feature which has been previously determined and must be considered to said recognized image data so as to calculate a coordinate set corresponding to either a pixel or a set of pixels, which constitute said image feature;

means for recognizing at least a coordinate value among coordinate values and pixel color values, which correspond to each of coordinates constituting said coordinate set, and for embedding said recognized coordinate value as a code of a digital watermark into either the pixel or the pixel set, which constitute said image feature, or into an area in the vicinity thereof;

means for applying a hash function to at least the coordinate value among the coordinate values and the pixel color values to produce a hash value originating from the image data;

means for recognizing text data contained in the electronic document;

means for applying a hash function to the text data to produce a hash value originating from the text data;

means for recognizing a first digital signature contained in the electronic document;

means for certifying validity of the first digital signature;

means for applying a hash function to attribute information of the first digital signature to produce a hash value originating from the first digital signature;

means for synthesizing the hash values originating from the image data, the text data, and the first digital signature to produce a synthesized hash value;

means for giving a second digital signature to the synthesized hash value;

means for converting the synthesized hash value into a computer readable visible pattern so as to produce visible certification data;

means for applying the visible certification data to the electronic document to which the digital watermark embedding process operation has been executed; and means for outputting the resulting electronic document to the print medium.

8. A computer-readable storage medium for storing thereinto a program which causes a computer to execute a method of managing genuine characteristics of both an electronic document and a print medium thereof, wherein:

said program causes said computer to execute:

a step for recognizing image data contained in the electronic document;

a step for applying an extraction condition of an image feature which has been previously determined and must be considered to said recognized image data so as to calculate a coordinate set corresponding to either a pixel or a set of pixels, which constitute said image feature;

a step for recognizing at least a coordinate value among coordinate values and pixel color values, which correspond to each of coordinates constituting said coordinate set, and for embedding said recognized coordinate value as a code of a digital watermark into either the pixel or the pixel set, which constitute said image feature, or into an area in the vicinity thereof;

a step for applying a hash function to at least the coordinate value among the coordinate values and the pixel color values to produce a hash value originating from the image data;

a step for recognizing text data contained in the electronic document;

a step for applying a hash function to the text data to produce a hash value originating from the text data;

a step for recognizing a first digital signature contained in the electronic document;

a step for certifying validity of the first digital signature;

a step for applying a hash function to attribute information of the first digital signature to produce a hash value originating from the first digital signature;

a step for synthesizing the hash values originating from the image data, the text data, and the first digital signature to produce a synthesized hash value;

a step for giving a second digital signature to the synthesized hash value;

a step for converting the synthesized hash value into a computer readable visible pattern so as to produce visible certification data;

a step for applying the visible certification data to the electronic document to which the digital watermark embedding process operation has been executed; and a step for outputting the resulting electronic document to the print medium.

\* \* \* \* \*